United States Patent
Le Rossignol et al.

(10) Patent No.: US 12,157,819 B2
(45) Date of Patent: Dec. 3, 2024

(54) RUBBER COMPOSITION FOR DYNAMIC USES, PRODUCTION METHOD THEREOF, PRODUCTS CONTAINING SAME, AND USES THEREOF

(71) Applicant: HUTCHINSON, Paris (FR)

(72) Inventors: Benoit Le Rossignol, Vannes (FR); Laina Guo, Montargis (FR); Marie Dubaa, Tournefeuille (FR); Patrice Woisel, Bailleul (FR)

(73) Assignee: Hutchinson, Paris (FR)

( * ) Notice: Subject to any disclaimer, the term of this patent is extended or adjusted under 35 U.S.C. 154(b) by 744 days.

(21) Appl. No.: 17/283,323

(22) PCT Filed: Oct. 8, 2019

(86) PCT No.: PCT/FR2019/052377
§ 371 (c)(1),
(2) Date: Apr. 7, 2021

(87) PCT Pub. No.: WO2020/074821
PCT Pub. Date: Apr. 16, 2020

(65) Prior Publication Data
US 2021/0355304 A1 Nov. 18, 2021

(30) Foreign Application Priority Data
Oct. 9, 2018 (FR) .................................... 18 59354

(51) Int. Cl.
| | |
|---|---|
| C08L 9/06 | (2006.01) |
| B60C 1/00 | (2006.01) |
| C08G 18/32 | (2006.01) |
| C08G 18/73 | (2006.01) |
| C08G 18/75 | (2006.01) |
| C08G 18/76 | (2006.01) |
| C08K 3/04 | (2006.01) |
| C08L 7/00 | (2006.01) |
| C08L 75/04 | (2006.01) |

(52) U.S. Cl.
CPC ............... C08L 9/06 (2013.01); B60C 1/00 (2013.01); C08G 18/3206 (2013.01); C08G 18/3212 (2013.01); C08G 18/3228 (2013.01); C08G 18/324 (2013.01); C08G 18/73 (2013.01); C08G 18/755 (2013.01); C08G 18/7664 (2013.01); C08K 3/04 (2013.01); C08L 7/00 (2013.01); C08L 75/04 (2013.01)

(58) Field of Classification Search
CPC .... C08L 9/06; C08L 7/00; C08L 75/04; C08L 9/00; C08L 21/00; B60C 1/00; C08G 18/3206; C08G 18/3212; C08G 18/3228; C08G 18/324; C08G 18/73; C08G 17/755; C08G 18/7664; C08G 71/04; C08K 3/04; C08K 3/06; F16F 15/08

USPC ........................................................ 524/495
See application file for complete search history.

(56) References Cited

U.S. PATENT DOCUMENTS

| | | | |
|---|---|---|---|
| 8,883,929 B2 | 11/2014 | Gandon-Pain et al. | |
| 2004/0010085 A1* | 1/2004 | Hall | C08L 51/04 |
| | | | 525/192 |
| 2014/0090548 A1* | 4/2014 | Abad | B60C 11/02 |
| | | | 87/6 |
| 2015/0197591 A1 | 7/2015 | Pierre et al. | |
| 2016/0194483 A1* | 7/2016 | Tahir | C08G 18/3243 |
| | | | 525/130 |

FOREIGN PATENT DOCUMENTS

JP 2011190385 A 9/2011

OTHER PUBLICATIONS

The English translation of the International Search Report, mailed on Jun. 8, 2020, in the corresponding PCT Appl. No. PCT/FR2019/052377.
Ponnamma et al. "Interrelated shape memory and Payne effect in polyurethane/graphene oxide nanocomposites," RSC Advances, vol. 3, No. 36, Jul. 2, 2013, p. 16068.
Yu et al. "Understanding the reinforcing behaviors of polyaniline-modified carbonyl iron particles in magnetorheological elastomer based on polyurethane/epoxy resin IPNs matrix" Composites Science and Technology, Elsevier, Amsterdam, NL, vol. 139, Dec. 10, 2016, pp. 36-46.

(Continued)

Primary Examiner — Hannah J Pak

(57) ABSTRACT

The invention relates to a rubber composition for a mechanical member with a dynamic function, to a process for preparing this composition, to such a member and to a use of a polymer bearing urethane functions. The composition is based on at least one elastomer and comprises a reinforcing filler and said polymer dispersed in the elastomer, the composition comprising the product of an in situ thermomechanical blending reaction of the elastomer with the filler, precursors of the polymer and a chain extender. According to the invention, the composition has a ratio G' 0.5%/G' 20% of storage moduli G' relative to the complex shear moduli G* satisfying at least one of the following conditions (i) to (v), G' 0.5% and G' 20% being measured according to the standard ISO 4664 at respective dynamic strain amplitudes of 0.5% and 20%, on double shear test specimens subjected to shear strains of from 0.02% to 50% at the same frequency of 5 Hz and at the same temperature T:

Figure 1:
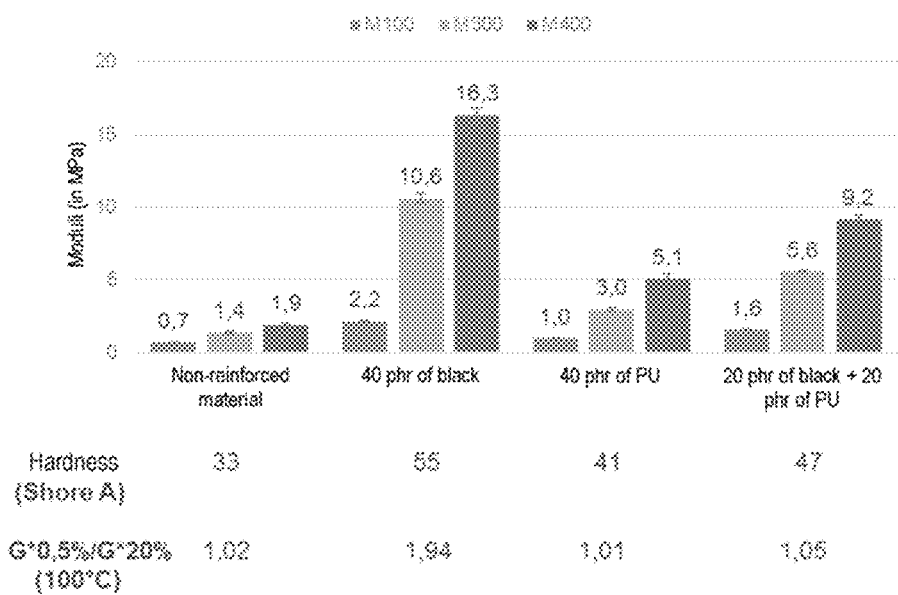

$G'0.5\%/G'20\% \leq 1.15$ for $T=100°$ C., (i)

$G'0.5\%/G'20\% \leq 1.40$ for $T=65°$ C., (ii)

$G'0.5\%/G'20\% \leq 1.50$ for $T=25°$ C., (iii)

$G'0.5\%/G'20\% \leq 1.60$ for $T=0°$ C., (iv)

$G'0.5\%/G'20\% \leq 2.50$ for $T=-30°$ C. (v)

29 Claims, 8 Drawing Sheets

(56) References Cited

OTHER PUBLICATIONS

Luginsland et al. "Influence of different silanes on the reinforcement of silica-filled rubber compounds" Rubber Chemistry and Technology, American Chemical Society, Rubber Division, US, vol. 4, Sep. 1, 2002, pp. 563-579.

Quan et al., "Advance in the Studies on Polybutadiene Polyurethane (UREA)," Polymer Bulletin, vol. 1, pp. 59-62, Feb. 28, 2003.

* cited by examiner

RUBBER COMPOSITION FOR DYNAMIC USES, PRODUCTION METHOD THEREOF, PRODUCTS CONTAINING SAME, AND USES THEREOF

This application is a National Stage Application of PCT/FR2019/052377 filed Oct. 8, 2019, which claims priority from French Patent Application No. 18 59354, filed on Oct. 9, 2018. The priority of said PCT and French Patent Application are claimed. Each of the prior mentioned applications is hereby incorporated by reference herein in its entirety.

The present invention relates to a rubber composition which is usable in a mechanical member with a dynamic function, to a process for preparing this composition, to such a member and to a use of a polymer bearing urethane functions. The invention applies notably to mechanical members chosen in particular from antivibration supports and elastic articulations for motorized vehicles or industrial devices, in a nonlimiting manner.

In a known manner, polyurethanes (PU) are obtained by reaction between isocyanate (NCO) and alcohol (OH) functional groups to produce the urethane function (NHCOO).

Among the polyurethanes that are typically prepared by reaction between a first precursor consisting of a polyisocyanate, a second precursor consisting of a long-chain polyol and a chain extender of polyol type, segmented polyurethanes are known, which comprise flexible segments formed by the second precursor and rigid segments formed by the first precursor and the chain extender, with a phase separation between these flexible and rigid segments which are mutually immiscible.

WO-A1-2015/032681 relates to mixtures of thermoplastic polyurethanes and of rubbers notably for printing rollers, and discloses exclusively in its examples the in situ production of a polyurethane-urea blended with a nitrile rubber (NBR) by reacting the latter with a single prepolymer prepared beforehand which jointly incorporates two polyisocyanate and macroglycol precursors and with a chain extender of diamine type.

A major drawback of the polyurethane-ureas synthesized in said document lies in the use of a prepolymer of precursors, which limits the in situ synthesis of the polyurethane-urea to the use of a polar elastomer such as NBR, and by the fact that the dispersion obtained from the polyurethane-urea in the NBR gives rise to mechanical properties and notably dynamic properties that are insufficient for the NBR/polyurethane-urea blends tested, which do not incorporate the slightest amount of reinforcing filler.

Non-isocyanate polyurethanes (NIPU) are moreover known, which have been recently developed in order to overcome the toxicity and stability problems of isocyanates and thus to anticipate a more stringent regulation regarding their use. These NIPUs are typically prepared by reacting amine derivatives with cyclic carbonates, to produce polyhydroxyurethanes (PHU) according to the reaction scheme below:

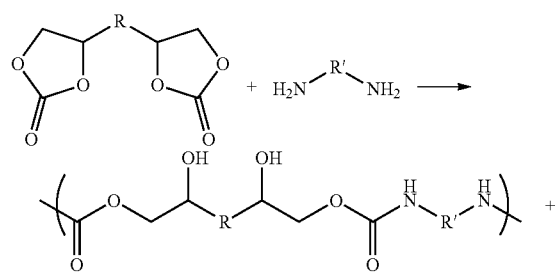

-continued

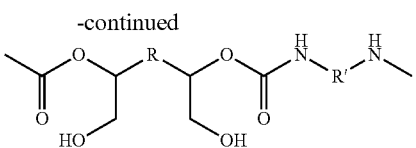

U.S. Pat. No. 9,416,227 B2 discloses the non-isocyanate preparation of microparticles from such a polyhydroxyurethane.

Conventionally, the reinforcement of elastomers in rubber compositions is performed by adding fillers such as carbon black and/or silica, in order to improve the mechanical properties of the compositions by means of the hydrodynamic effect and of the interactions between the elastomer and the fillers, on the one hand, and between the fillers themselves, on the other hand.

However, these filler-elastomer and filler-filler interactions give rise to an undesirable phenomenon usually referred to as the Payne effect and which is reflected by a nonlinearity (i.e. amplitude stiffening) and a stiffening notably at low temperatures of crosslinked rubber compositions subjected to dynamic stresses. This stiffening entails dynamic properties that may prove to be unsatisfactory for the compositions due to the abovementioned interactions with the reinforcing fillers used, these dynamic properties usually being able to be evaluated by measuring, at two dynamic strain amplitudes, a ratio of storage moduli G' relative to the complex shear moduli G* of the compositions. As a reminder, the complex modulus G* is defined by the equation G*=G'+iG", with:

G': real part of G* known as the storage modulus or elastic modulus, G' characterizing the stiffness or the viscoelastic behavior of the composition (i.e. the energy stored and totally restored); and G": imaginary part of G* known as the loss modulus, G" characterizing the viscous behavior of the composition (i.e. the energy dissipated in the form of heat, it being pointed out that the ratio G"/G' defines the tan δ loss factor).

This ratio typically corresponds to G', measured by dynamic mechanical analysis (DMA) at a low dynamic strain amplitude, relative to G' measured at a high dynamic strain amplitude, the two moduli G' being measured at the same frequency and at the same temperature (e.g. G' 0.5%/G' 20%). In a known manner, G' 0.5%/G' 20% is typically between 1.80 and 2.00 for a rubber composition based on a polyisoprene (IR) and reinforced with 40 phr of an N330 grade carbon black in order to be usable in dynamic applications (phr: parts by weight per 100 parts of elastomer(s)). Indeed, it is known that in reinforced materials, the viscoelastic behavior varies starting from small dynamic strain amplitudes, with a substantial decrease in G' with a significant increase in strain.

In the course of its recent research, the Applicant sought intensively to minimize this Payne effect in crosslinked rubber compositions by minimizing the abovementioned ratio of storage moduli G' 0.5%/G' 20% so that it is as close as possible to 1.00, in order for the storage modulus G' at a maximum strain of 20% to be barely more reduced than that at a virtually zero strain of 0.5% without penalizing the static properties of the compositions (notably in terms of secant moduli and of stiffness), so as to make these compositions particularly advantageous in dynamic applications.

One aim of the present invention is thus to propose novel rubber compositions which notably overcome the abovementioned drawbacks by in particular improving the dynamic properties of the rubber compositions of the prior art while at the same time conserving their static properties.

This aim is achieved in that the Applicant has essentially just discovered, surprisingly, that if an elastomer is reacted by thermomechanical blending with a reinforcing filler, precursors of a polymer bearing urethane groups and a chain extender, and if the product of this reaction is then crosslinked, then, under certain conditions detailed below, it is possible to obtain a fine and homogeneous dispersion in the elastomer of this polymer bearing urethane groups which is segmented by being formed in situ in the elastomer matrix with, for the composition obtained, a minimized Payne effect and conserved static properties, in comparison with a crosslinked rubber mixture based on the same elastomer but free of polymer bearing urethane groups and instead comprising the same reinforcing filler in an amount increased by the amount of said polymer in the composition.

In other words, a rubber composition according to the invention is based on at least one elastomer and comprises a reinforcing filler and a polymer bearing urethane groups dispersed in said at least one elastomer, the composition comprising the product of an in situ thermomechanical blending reaction of said at least one elastomer with said reinforcing filler, precursors of said polymer bearing urethane groups and a chain extender.

According to the invention, the composition, which is usable in a mechanical member with a dynamic function chosen in particular from antivibration supports and elastic articulations for motorized vehicles or industrial devices, has a ratio G' 0.5%/G' 20% of storage moduli G' relative to the complex shear moduli G* satisfying at least one of the following conditions (i) to (v), G' 0.5% and G' 20% being measured according to the standard ISO 4664 at respective dynamic strain amplitudes of 0.5% and 20%, on double shear test specimens subjected to shear strains of from 0.02% to 50% at the same frequency of 5 Hz and at the same temperature T:

$$G'0.5\%/G'20\% \leq 1.15 \text{ for } T=100° C., \quad (i)$$

$$G'0.5\%/G'20\% \leq 1.40 \text{ for } T=65° C., \quad (ii)$$

$$G'0.5\%/G'20\% \leq 1.50 \text{ for } T=25° C., \quad (iii)$$

$$G'0.5\%/G'20\% \leq 1.60 \text{ for } T=0° C., \quad (iv)$$

$$G'0.5\%/G'20\% \leq 2.50 \text{ for } T=-30° C. \quad (v)$$

The term "reinforcing filler" means herein any dispersed filler which is very finely divided in the elastomer matrix of the composition (i.e. in said at least one elastomer) and which is capable of reinforcing the composition notably to give it secant moduli, a sufficiently high tensile strength and a sufficiently high stiffness, this filler possibly comprising at least one organic filler such as a carbon black which is sufficiently reinforcing for the application under consideration and/or at least one inorganic filler such as a silica which is sufficiently reinforcing for this application.

The term "product of an in situ thermomechanical blending reaction" means herein, in the usual manner, the mixture produced by mechanical working of the abovementioned ingredients comprising at least one thermal step, during which not only is said at least one elastomer blended with said reinforcing filler, said precursors and said chain extender, but also preferably with other additives conventionally used in rubber compositions such as an activator complex (e.g. zinc oxide and stearic acid) and a plasticizer (e.g. an oil), with the exception of the crosslinking system (e.g. a vulcanization system comprising sulfur and accelerators) which is added to the noncrosslinked mixture obtained following this thermomechanical blending for the purpose of obtaining the composition according to the invention, which is finally crosslinked in a known manner, as explained below.

It will be noted that a crosslinked rubber composition according to the invention thus obtained forms entangled networks comprising a crosslinked elastomer network incorporating rigid segments of said polymer bearing urethane groups, and an organic reinforcing network comprising flexible segments of this polymer, which is advantageously finely dispersed and globally homogeneous in the elastomer, as explained below. The Applicant has discovered that this particular entanglement of flexible and rigid segments, respectively, formed by this polymer thus dispersed makes it possible to obtain the abovementioned particularly advantageous conditions (i) to (v), at least one of which is satisfied for said ratio G' 0.5%/G' 20%.

It will also be noted that these conditions (i) to (v) are evidence of minimization (i.e. a significant reduction) of the Payne effect over a wide temperature range extending from −30° C. to 100° C., in comparison with the Payne effect observed for a conventional crosslinked composition free of said polymer and comprising the same reinforcing filler but in an amount increased by the amount of said polymer in the composition (all the other ingredients remaining unchanged).

It will also be noted that in a rubber composition according to the invention, said polymer bearing urethane groups also exerts a reinforcing function on the rubber composition, advantageously as a supplement to a given amount of said reinforcing filler that this polymer may partly replace, as demonstrated in the implementation examples below which show static secant modulus, tensile strength and hardness properties that are substantially conserved.

Advantageously, the composition of the invention may satisfy at least condition (i), and preferably also conditions (ii), (iii), (iv) and (v), and said test specimens may be subjected to preliminary mechanical conditioning of 0±4 mm, 50 mm/minute over 8 cycles.

According to a preferential example of the invention, the composition comprises (phr: parts by weight per 100 parts of elastomer(s)) from 10 to 40 phr of a carbon black as reinforcing filler and from 10 to 50 phr of said polymer bearing urethane groups, the composition preferably also satisfying the following condition (i-a):

$$G'0.5\%/G'20\% \leq 1.12 \text{ for } T=100° C. \quad (i\text{-a})$$

Even more preferentially, the composition of the invention comprises from 15 to 30 phr of said carbon black, for example of N330 grade, and from 15 to 30 phr of said polymer bearing urethane groups.

According to another aspect of the invention, said polymer bearing urethane groups may be dispersed in said at least one elastomer in the form of nodules of larger number-average transverse dimension (i.e. the diameter in the case of globally spherical nodules) of between 1 nm and 5 μm, preferably between 50 nm and 2 μm and even more preferentially between 100 nm and 1 μm.

It will be noted that this dispersion of said polymer in the continuous elastomer matrix of the composition is thus advantageously fine and globally homogeneous, which contributes significantly toward obtaining the abovementioned mechanical properties of the compositions of the invention notably including their minimized Payne effect by reduction of said ratio G' 0.5%/G' 20%.

In general, the compositions of the invention may advantageously also have:

at least one of the following secant moduli M100, M300 and M400 at 100%, 300% and 400% strain, respectively, measured in uniaxial tension according to the standard ASTM D 412:
M100≥1.5 MPa,
M300≥5.5 MPa, and
M400≥9.5 MPa;
and/or
a tensile strength R/r measured in uniaxial tension according to the standard ASTM D 412 of at least 26 MPa.

It will be noted that these static properties of the composition are advantageously close to those presented by a conventional crosslinked a composition free of said polymer and comprising the same reinforcing filler, such as a carbon black, for example of N330 grade, but in an amount increased by the amount of said polymer in the composition (all the other ingredients remaining unchanged).

Advantageously, a composition according to the invention may have a Shore A hardness, measured according to the standard ASTM D 2240, of at least 48 and preferably between 50 and 55.

In general for a composition according to the invention, said at least one elastomer may advantageously be a rubber chosen from diene or non-diene elastomers, with the exception of silicone rubbers, and the composition comprises a crosslinking system, for example with sulfur, which is capable of reacting with said product of said in situ thermomechanical blending reaction to co-crosslink said at least one elastomer with said polymer bearing urethane groups.

Preferably, said at least one elastomer is an apolar diene elastomer, even more preferentially being chosen from natural rubber (NR), polyisoprenes (IR), polybutadienes (BR) and styrene-butadiene copolymers (SBR).

In contrast with a polar diene elastomer such as the nitrile rubber (NBR) tested in WO-A1-2015/032681, it will be noted that the use of a specifically apolar diene elastomer makes it possible to obtain an improved dispersion (both in terms of fineness and of homogeneity) of said polymer bearing urethane groups in this apolar elastomer, and consequently to improve the dynamic properties of the composition by minimizing said ratio G' 0.5%/G' 20% and also the Payne effect observed for this composition.

Also in general for a composition according to the invention, said polymer bearing urethane groups is advantageously segmented with:

rigid segments which may be present in said polymer in a mass fraction of between 20% and 40%, preferably between 25% and 35%, and which comprise said chain extender and a first said precursor, and with flexible segments comprising a second said precursor which is a diene polymer bearing functionalized chain ends, preferably a functionalized polybutadiene, said polymer bearing urethane groups being co-crosslinked, via double bonds of said second precursor, with said at least one elastomer, forming a three-dimensional network connected via covalent bonds to said at least one elastomer.

It will be noted that this particular mass fraction of said rigid segments in said polymer is preferentially, due to the fact that it contributes toward minimizing said ratio G' 0.5%/G' 20% without penalizing the abovementioned static properties of the composition of the invention.

It will also be noted that the chemical co-crosslinking according to the invention (e.g. co-vulcanization for crosslinking with sulfur) of the polymer bearing urethane groups with said at least one elastomer is made possible by the double bonds present in said second precursor, and that it makes it possible to better reinforce the composition by the covalent bonds and to reduce the Payne effect therein, in comparison with a composition in which the polymer bearing urethane groups is bonded to the elastomer only via weak-energy bonds of van der Waals type.

According to a preferential characteristic of the invention, said first precursor and second precursor form two separate reagents for said in situ thermomechanical blending reaction with said at least one elastomer, said reinforcing filler and said chain extender, said precursors not forming a prepolymer of precursors.

In other words and contrary to the use of a prepolymer of precursors in the examples of WO-A1-2015/032681 which limits the dispersion of the polyurethane-urea in the NBR polar elastomer by penalizing the quality of this dispersion, the two precursors according to the invention are preferably added separately to the elastomer to perform the thermomechanical blending.

It will be noted that this separate reaction of said at least one elastomer with the two precursors added separately contributes toward improving the quality of the dispersion obtained of said polymer bearing urethane groups in the elastomer matrix, both in terms of fineness and of homogeneity.

Even more preferentially, said chain extender has a molar mass of less than or equal to 700 g/mol and preferably less than 600 g/mol.

It will also be noted that said chain extender is advantageously characterized by a short chain.

According to a first embodiment of the invention, said polymer bearing urethane groups belongs to the family of polyurethanes (PU) obtained from an isocyanate compound, excluding polyurethane-ureas such as those synthesized in the examples of WO-A1-2015/032681.

In accordance with this first embodiment of the invention:

said first precursor may be a polyisocyanate with a functionality of greater than 2, preferably chosen from monomers or prepolymers based on 4,4'-methylenebis(phenyl isocyanate), isophorone diisocyanate, hexamethylene diisocyanate and 4,4'-diphenylmethylene diisocyanate, said second precursor may be a diol-functionalized diene polymer with a functionality of greater than 2, preferably a non-hydrogenated hydroxytelechelic polybutadiene with a number-average molecular mass of between 1000 and 3000 g/mol and a functionality of greater than or equal to 2.2, and said chain extender may be a polyol chosen from diols and triols which has a molar mass of less than or equal to 300 g/mol (short-chain polyol), preferably chosen from cyclohexanedimethanol, isosorbide and glycerol.

According to a preferential example of this first embodiment of the invention:

said at least one elastomer is advantageously an apolar diene elastomer, preferably chosen from natural rubber (NR), polyisoprenes (IR), polybutadienes (BR) and styrene-butadiene copolymers (SBR), said reinforcing filler comprises a carbon black, for example of N330 grade, present in the composition in an amount of between 15 and 30 phr (phr: parts by weight per 100 parts of elastomer(s)), said polymer bearing urethane groups is advantageously present in the composition in an amount of between 15 and 30 phr, and the total amount of said carbon black and of said polymer bearing urethane groups in the composition is advantageously between 35 and 55 phr.

In accordance with this preferential example of the first embodiment of the invention, the composition may advantageously satisfy the following condition (i-a):

$$G'0.5\%/G'20\% \leq 1.12 \text{ for } T=100° C. \tag{i-a}$$

According to a second embodiment of the invention, said polymer bearing urethane groups belongs to the family of non-isocyanate polyhydroxyurethanes (NIPU).

In accordance with this second embodiment of the invention:

said first precursor may be a polyamine chosen from diamines and triamines, preferably chosen from 1,3-cyclohexanebis(methylamine), xylylenediamine, 2,2'-(ethylenedioxy)bis(ethylamine) and tris(2-aminoethyl)amine, said second precursor may be a diene polymer functionalized with cyclocarbonate chain ends, preferably a polybutadiene functionalized with two carbonate end rings which are each 5- or 6-membered, and said chain extender may be a cyclic carbonate which has a molar mass of less than or equal to 500 g/mol (i.e. short-chained), preferably chosen from cyclohexane bis carbonate, resorcinol bis carbonate, glycerol tricarbonate and phloroglucinol tricarbonate.

According to a preferential example of this second embodiment of the invention:

said at least one elastomer is advantageously an apolar diene elastomer, preferably chosen from natural rubber (NR), polyisoprenes (IR), polybutadienes (BR) and styrene-butadiene copolymers (SBR), said reinforcing filler comprises a carbon black, for example of N330 grade, present in the composition in an amount of between 15 and 30 phr (phr: parts by weight per 100 parts of elastomer(s)), said polymer bearing urethane groups is present in the composition in an amount of between 15 and 30 phr, and the total amount of said carbon black and of said polymer bearing urethane groups in the composition is between 35 and 55 phr.

In accordance with this preferential example of the second embodiment of the invention, the composition may advantageously satisfy at least one and preferably all of the following conditions (i-a) to (v-a):

$$G'0.5\%/G'20\% \leq 1.12 \text{ for } T=100° C., \tag{i-a}$$

$$G'0.5\%/G'20\% \leq 1.20 \text{ for } T=65° C., \tag{ii-a}$$

$$G'0.5\%/G'20\% \leq 1.30 \text{ for } T=25° C., \tag{iii-a}$$

$$G'0.5\%/G'20\% \leq 1.40 \text{ for } T=0° C., \tag{iv-a}$$

$$G'0.5\%/G'20\% \leq 1.50 \text{ for } T=-30° C. \tag{v-a}$$

In accordance with this preferential example of said second embodiment, the composition more advantageously also satisfies at least one and preferably all of the following conditions (i-b) to (v-b):

$$G'0.5\%/G'20\% \leq 1.10 \text{ for } T=100° C., \tag{i-b}$$

$$G'0.5\%/G'20\% \leq 1.15 \text{ for } T=65° C., \tag{ii-b}$$

$$G'0.5\%/G'20\% \leq 1.20 \text{ for } T=25° C., \tag{iii-b}$$

$$G'0.5\%/G'20\% \leq 1.25 \text{ for } T=0° C., \tag{iv-b}$$

$$G'0.5\%/G'20\% \leq 1.40 \text{ for } T=-30° C. \tag{v-b}$$

A mechanical member with a dynamic function according to the invention is in particular chosen from antivibration supports and elastic articulations for motorized vehicles or industrial devices, said member comprising at least one elastic part which consists of a rubber composition as defined above and which is suitable to be subjected to dynamic stresses.

A process according to the invention for preparing a rubber composition as defined above comprises the following steps:

a) formation of a noncrosslinked mixture comprising a dispersion, in said at least one elastomer, of said polymer bearing urethane groups via said thermomechanical blending reaction of said at least one elastomer with said reinforcing filler, said precursors and said chain extender, said reaction preferably being performed in an internal mixer at a maximum temperature of between 130° C. and 180° C., b) addition to the mixture of a crosslinking system with mechanical working of the crosslinkable mixture thus obtained preferably performed in an open mill at a maximum temperature below 80° C., and then c) crosslinking of the crosslinkable mixture by vulcanization in a press at a temperature of between 130° C. and 180° C., preferably by compression molding, said polymer bearing urethane groups being chemically co-crosslinked with said at least one elastomer, forming covalent bonds therewith.

It will be noted that this chemical co-crosslinking makes it possible to satisfactorily reinforce the composition obtained while at the same time minimizing the Payne effect therein, and that this co-crosslinking is made possible by the double bonds borne by said second precursor and by the use of a functionality of greater than 2 for each of the first and second precursors.

It will also be noted that the thermomechanical blending of step a) may comprise at least one thermal step, of which the minimum temperature to be reached and the maximum temperature not to exceed may be between 130° C. and 180° C. and preferably between 140° C. and 170° C. The appropriate blending time varies as a function of the operating conditions adopted by a person skilled in the art and in particular of the temperature chosen, and the nature and volume of the ingredients subjected to the thermomechanical work.

Preferably, said precursors form a first precursor and a second precursor which are added separately in step a) after said at least one elastomer, said polymer bearing urethane groups being segmented with rigid segments comprising said chain extender and said first precursor and with flexible segments comprising said second precursor.

It will be noted that the introduction first of said at least one elastomer (preferably an apolar diene elastomer) into the internal mixer makes it possible to sufficiently plasticize this elastomer and to facilitate the incorporation of the other ingredients subsequently added to the elastomer matrix.

Even more preferentially, the total mass fraction of said first precursor and of said chain extender in said polymer bearing urethane groups formed in step a) is between 20% and 40%, preferably between 25% and 35%.

According to another aspect of the invention, a polymer bearing urethane groups dispersed in a rubber composition based on at least one elastomer via an in situ thermomechanical blending reaction of said at least one elastomer with a reinforcing filler, precursors of said polymer and a chain extender is used to reduce the Payne effect in the composition at a temperature T inclusively between −30° C. and 100° C., the Payne effect being quantified by said ratio G' 0.5%/G' 20% of storage moduli G' relative to the complex shear moduli G* of the composition, in comparison with a rubber mixture based on said at least one elastomer, free of said polymer bearing urethane groups and comprising said reinforcing filler in an amount in phr equal to the sum of the phrs, in the composition, of said reinforcing filler and of said polymer bearing urethane groups.

According to this use of the invention, the composition comprising (phr: parts by weight per 100 parts of elastomer(s)) from 10 to 40 phr of a carbon black as reinforcing filler and from 10 to 50 phr of said polymer bearing urethane groups, may be advantageously used to reduce said ratio G' 0.5%/G' 20% by more than 40% and optionally also to conserve, to within 15%, the Shore A hardness of the composition, in comparison with said rubber mixture free of said polymer bearing urethane groups and comprising said carbon black in an amount in phr equal to the sum of the phrs, in the composition, of said carbon black and of said polymer.

Other features, advantages and details of the present invention will emerge on reading the following description of several examples of implementation of the invention, which are given as nonlimiting illustrations in relation with the attached drawings, among which:

FOR THE FIRST EMBODIMENT OF THE INVENTION (PU)

Figure 2:
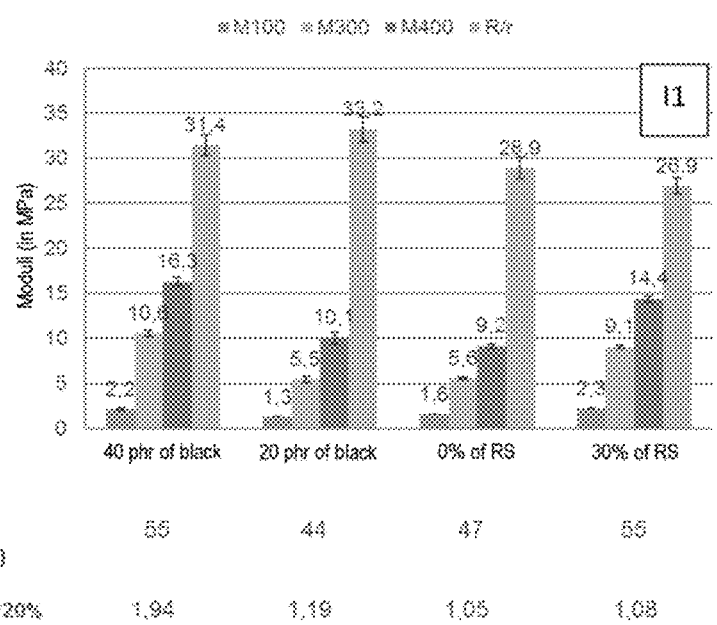
Figure 5:
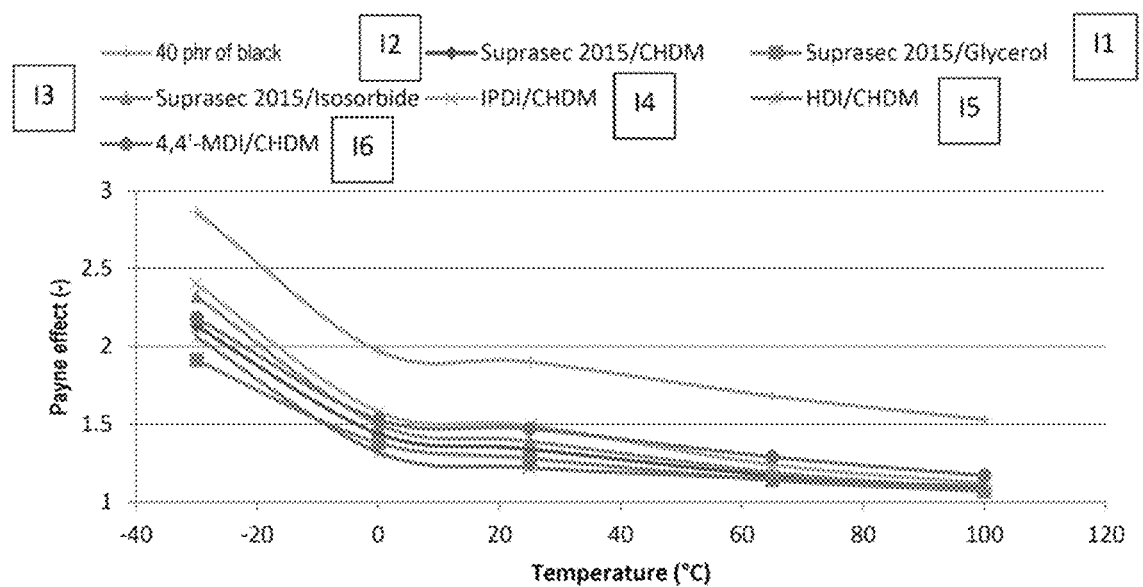
Figure 2A:
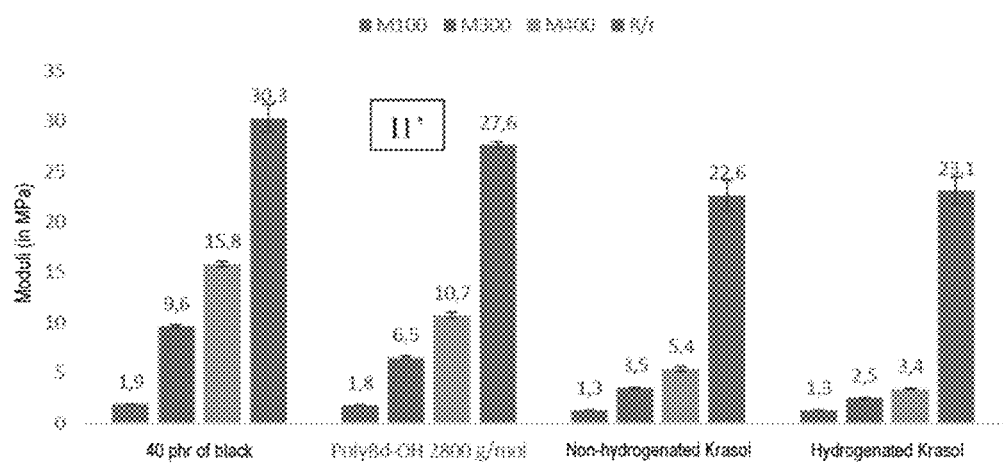
Figure 3:
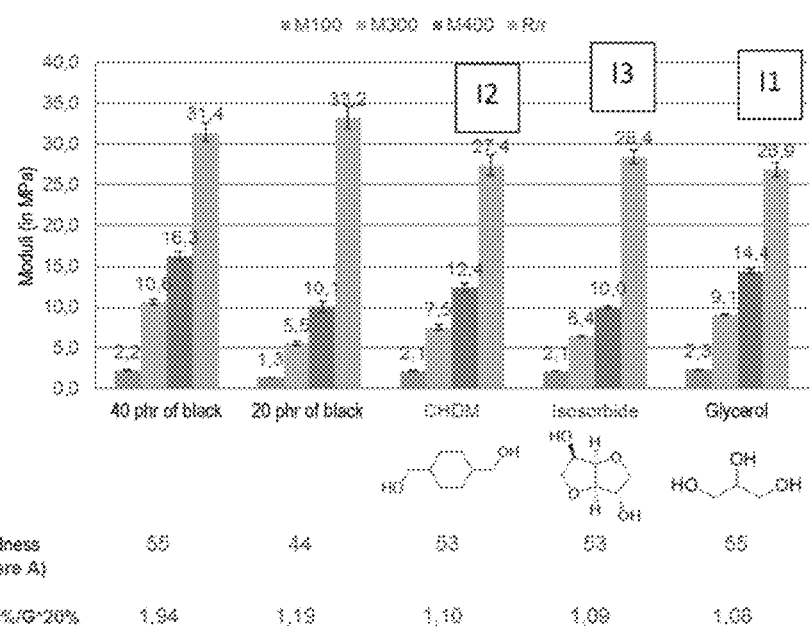
Figure 4:
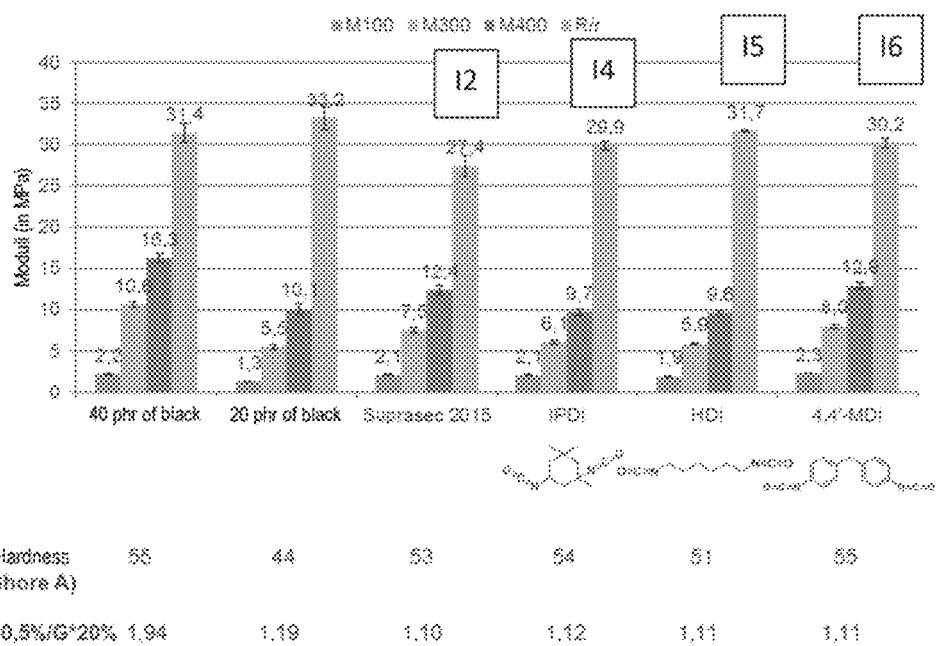
Figure 6:
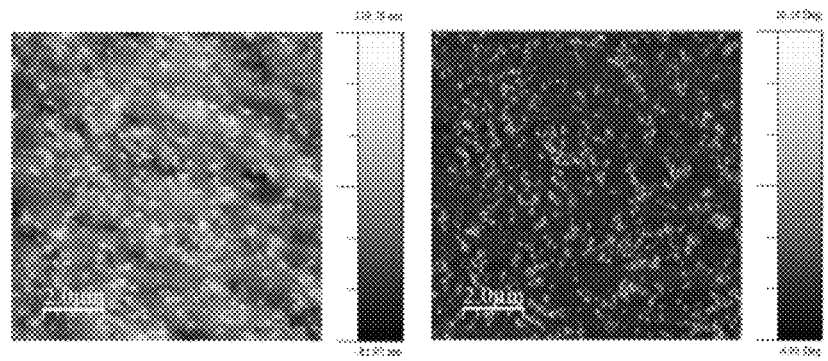
Figure 7:
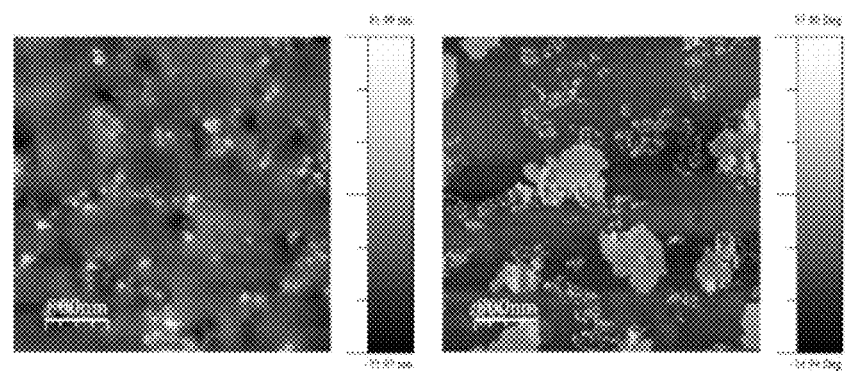
Figure 8:
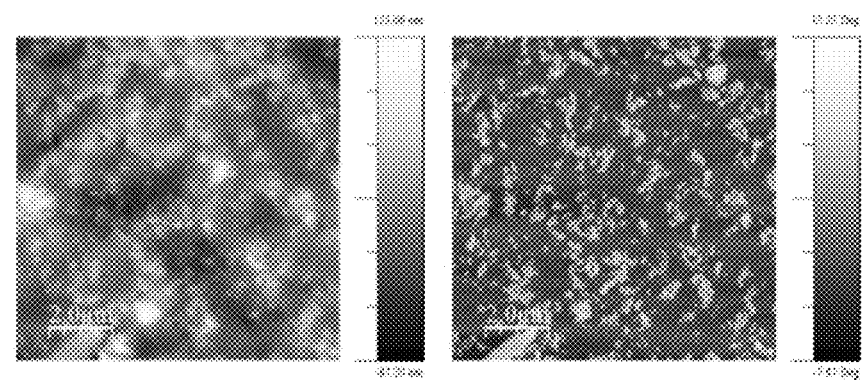
Figure 9:
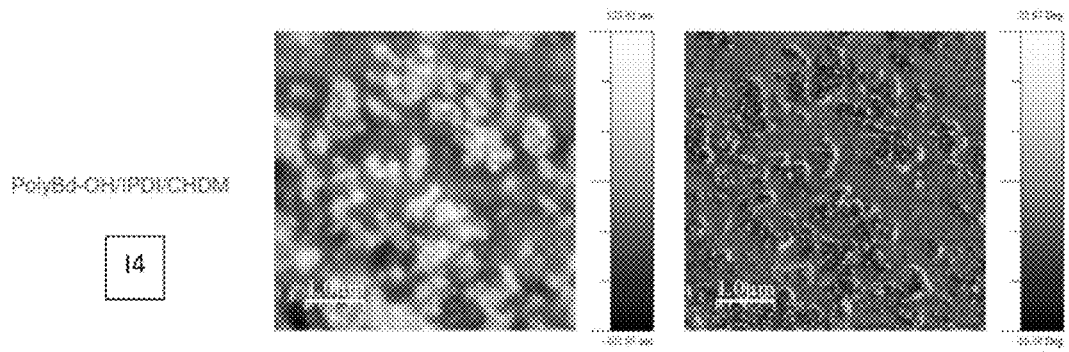
Figure 10:
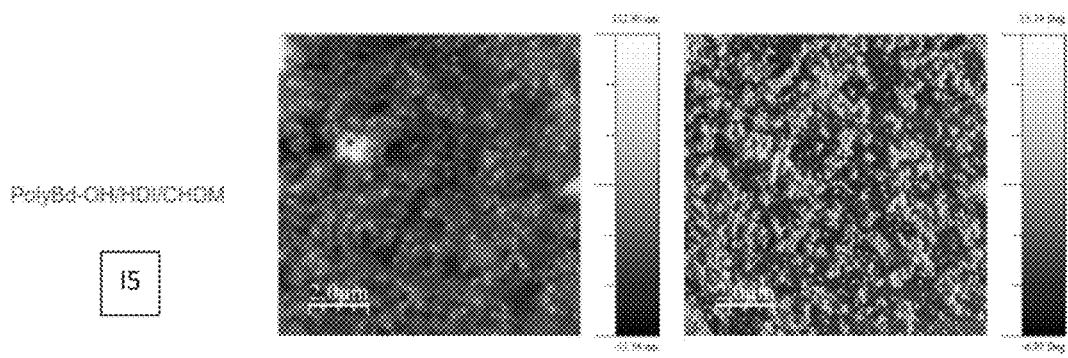

FIG. 1 is a graph illustrating the secant moduli M100, M300 and M400, the Shore A hardness and the ratio G' 0.5%/G' 20% at 100° C. of a non-reinforced control rubber mixture, of a mixture of the prior art reinforced with 40 phr of carbon black, of a rubber mixture not in accordance with the invention which is not reinforced and comprises 40 phr of a PU without chain extender (i.e. without rigid segments, referred to as RS hereinbelow) and of a rubber composition not in accordance with the invention which comprises 20 phr of carbon black and 20 phr of PU without RS, FIG. 2 is a graph illustrating the influence of adding a glycerol chain extender on M100, M300 and M400, the tensile strength R/r, the Shore A hardness and the G' 0.5%/G' 20% at 100° C., for said mixture of the prior art reinforced with 40 phr of carbon black, another mixture of the prior art reinforced with 20 phr of carbon black, said composition not in accordance with the invention and a composition I1 according to the invention with 20 phr of carbon black and 20 phr of a PU comprising 30% by mass of RS, FIG. 2a is a graph illustrating the influence of the functionality and the unsaturations of the second precursor on M100, M300 and M400, and R/r, for a mixture of the prior art with 40 phr of carbon black, two mixtures not in accordance with the invention with 20 phr of carbon black and 20 phr of a PU derived from a first precursor according to the invention but from a second precursor not in accordance with the invention, and a composition I1' according to the invention with 20 phr of carbon black and 20 phr of a PU derived from the same first precursor but from a second precursor according to the invention, FIG. 3 is a graph illustrating the influence, for the same polyisocyanate (Suprasec 2015) and polyol (polyBd R20 LM) precursors as for composition I1, of various chain extenders on M100, M300 and M400, R/r, Shore A and G' 0.5%/G' 20% at 100° C., for the mixture of the prior art reinforced with 40 phr of carbon black, the other mixture of the prior art reinforced with 20 phr of carbon black and three compositions according to the invention I2, I3 and I1 with 20 phr of carbon black and 20 phr of three PUs comprising 30% by mass of RS and obtained, respectively, with CHDM, isosorbide and glycerol chain extenders (see the illustrated formulae), FIG. 4 is a graph illustrating, for the same CHDM chain extender and polyol precursor (polyBd R20 LM), the influence of various polyisocyanate precursors on M100, M300 and M400, R/r, Shore A and G' 0.5%/G' 20% at 100° C., for the mixture of the prior art reinforced with 40 phr of carbon black, the other mixture of the prior art reinforced with 20 phr of carbon black, composition I2 with the polyisocyanate Suprasec 2015 and three other compositions according to the invention I4, I5 and I6 with 20 phr of carbon black and 20 phr of three other PUs comprising 30% by mass of RS but obtained, respectively, with IPDI, HDI and 4,4'-MDI polyisocyanates (see the illustrated formulae), FIG. 5 is a graph illustrating the ratios G' 0.5%/G' 20% obtained at various temperatures ranging from −30° C. to 100° C., for the mixture of the prior art reinforced with 40 phr of carbon black and compositions I1, I2, I3, I4, I5 and I6, FIGS. 6, 7, 8, 9 and 10 are atomic force microscopy (AFM) images in "tapping" mode obtained, respectively, for compositions I2, I3, I1, I4 and I5, with, for each composition, the left-hand image as a topographic image and the right-hand image as a phase image,

FOR THE SECOND EMBODIMENT OF THE INVENTION (NIPU)

Figure 11:
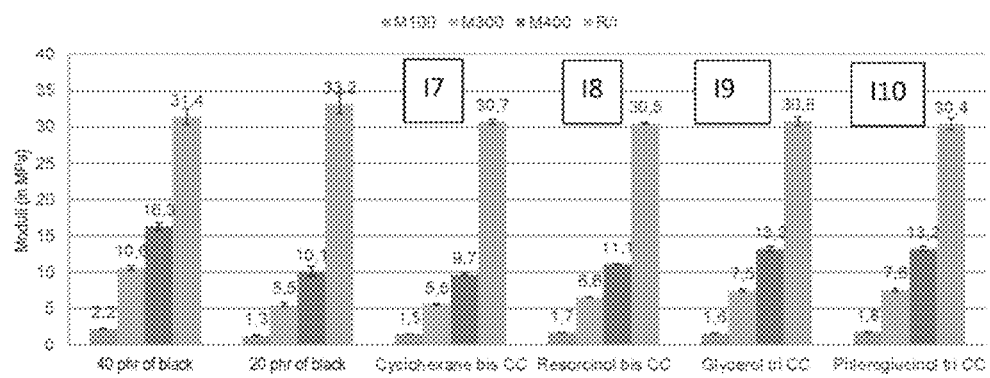
Figure 12:
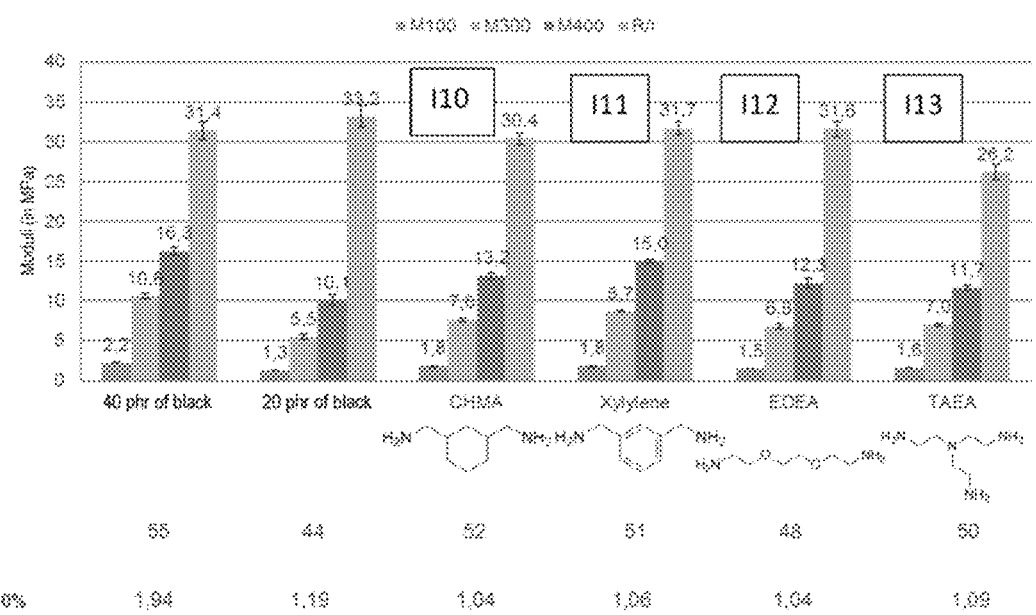
Figure 13:
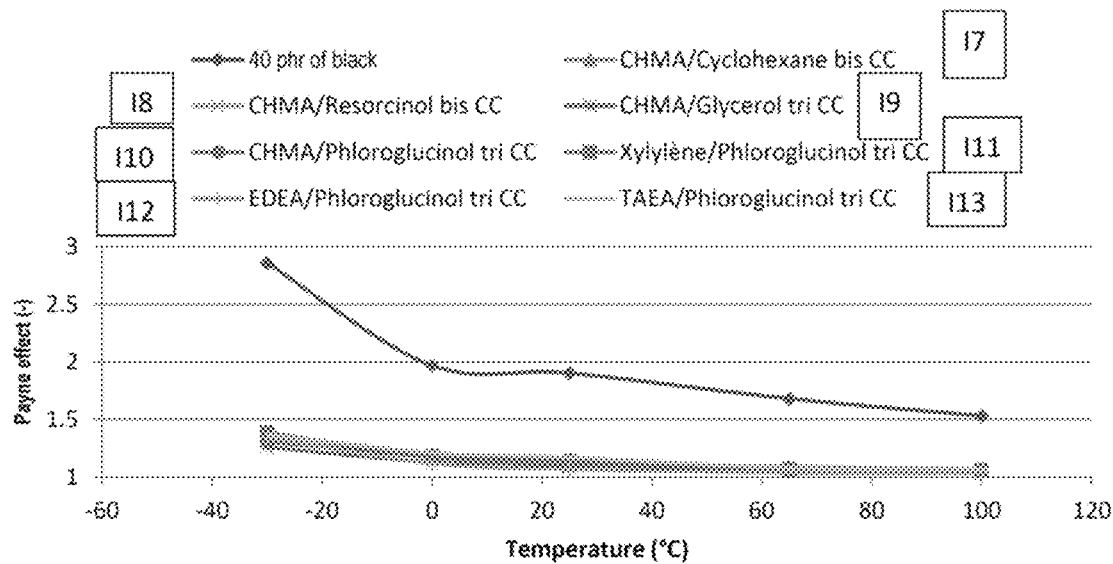
Figure 14:
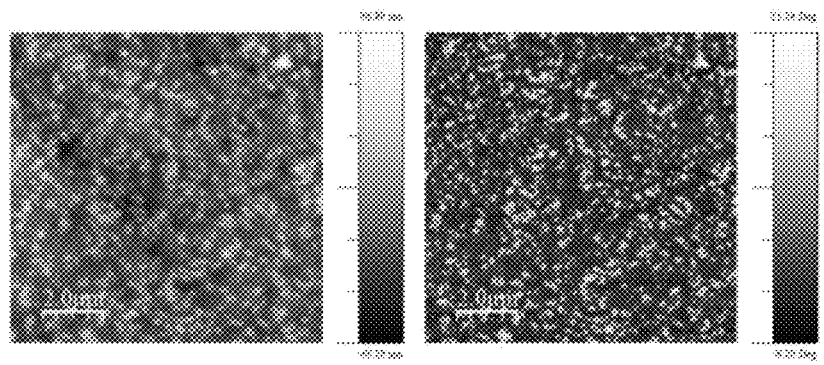
Figure 15:
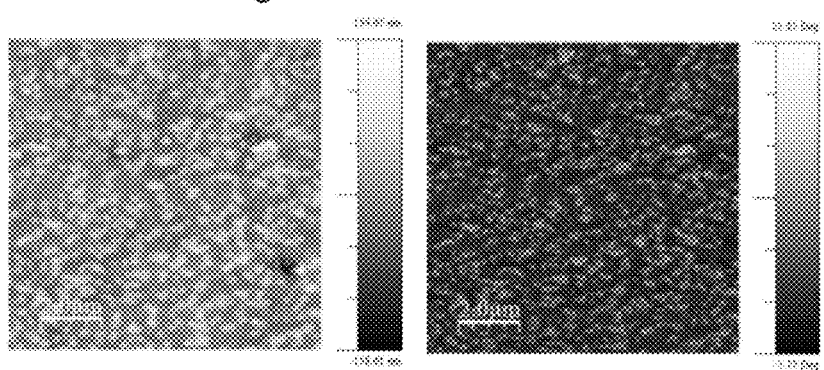
Figure 16:
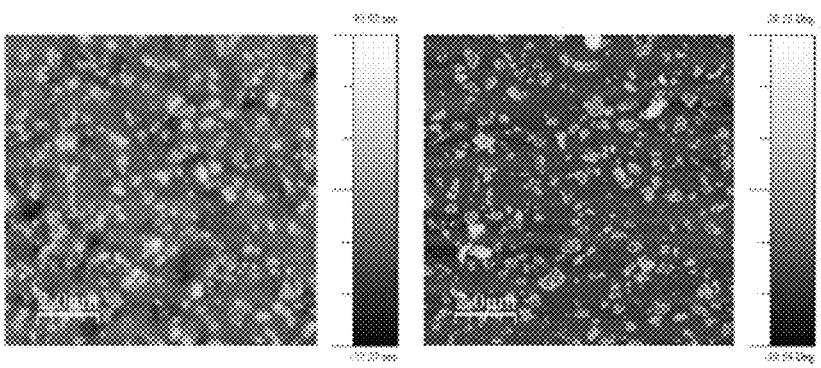
Figure 17:
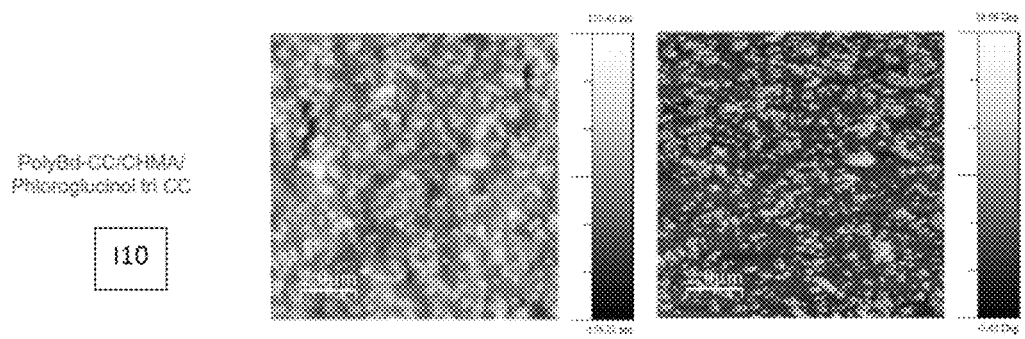
Figure 18:
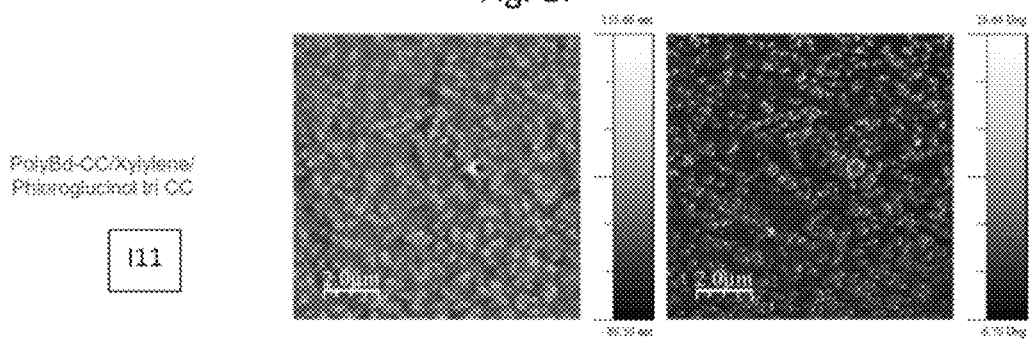
Figure 19:
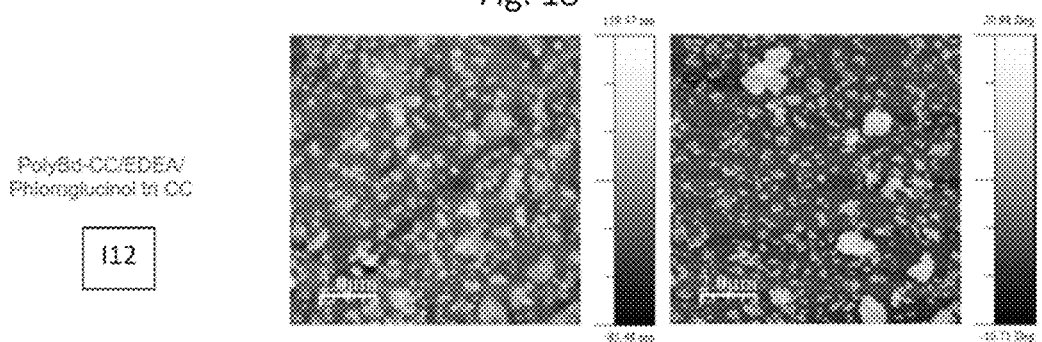
Figure 20:
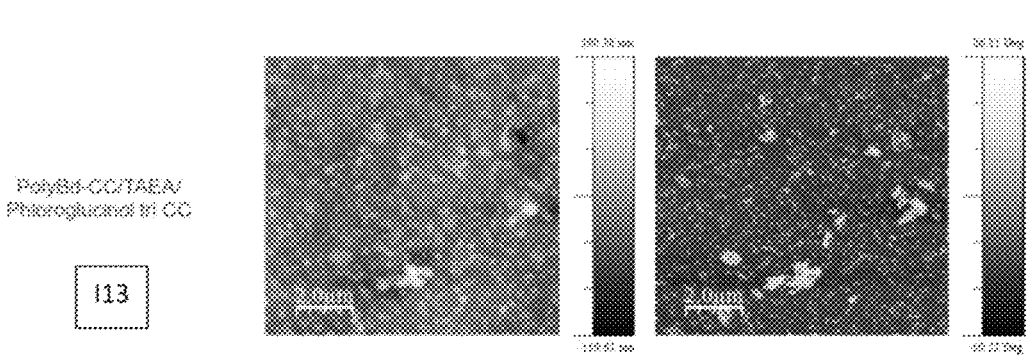

FIG. 11 is a graph illustrating the influence, for the same first polyamine precursor (1,3-cyclohexanebis(methylamine), abbreviated as CHMA) and the same second polycyclocarbonate precursor (cyclocarbonate-terminated polybutadiene), of various cyclic carbonate (abbreviated as CC hereinbelow) chain extenders on M100, M300 and M400, R/r, Shore A and G' 0.5%/G' 20% at 100° C., for the mixture of the prior art reinforced with 40 phr of carbon black, the other mixture of the prior art reinforced with 20 phr of carbon black, and four compositions according to the invention I7, I8, I9 and I10 with 20 phr of carbon black and 20 phr of four NIPUs obtained, respectively, with the cyclohexane bis CC, resorcinol bis CC, glycerol tri CC and phloroglucinol tri CC extenders (see the illustrated formulae), FIG. 12 is a graph illustrating the influence, for the same phloroglucinol tri CC chain extender and the same polycyclocarbonate second precursor (cyclocarbonate-terminated polybutadiene), of various first polyamine precursors on M100, M300 and M400, R/r, Shore A and G' 0.5%/G' 20% at 100° C., for the mixture of the prior art reinforced with 40 phr of carbon black, the other mixture of the prior art reinforced with 20 phr of carbon black, composition I10 with the CHMA extender and three other compositions according to the invention I11, I12 and I13 with 20 phr of carbon black and 20 phr of three NIPUs obtained, respectively, with the polyamines xylylenediamine, EDEA and TAEA (see the illustrated formulae), FIG. 13 is a graph illustrating the ratios G' 0.5%/G' 20% obtained at various temperatures ranging from −30° C. to 100° C., for the mixture of the prior art reinforced with 40 phr of carbon black and compositions I7, I8, I9, I10, I11, I12 and I13, and FIGS. 14, 15, 16, 17, 18, 19 and 20 are atomic force microscopy (AFM) images in "tapping" mode obtained, respectively, for compositions I7, I8, I9, I10, I11, I12 and I13, with, for each composition, the left-hand image as a topographic image and the right-hand image as a phase image.

In all these examples of mixtures and of compositions thus illustrated, the elastomer matrix used is the same synthetic polyisoprene known as IR Nipol 2200, with N330 carbon black as reinforcing filler and the ingredients identified in the tables below (expressed in phr: parts by weight per 100 parts of IR).

For the first embodiment of the invention illustrated in FIGS. 1 to 10, the PUs were obtained in situ with the following first and second precursors for compositions I1, I2 and I3 according to the invention:

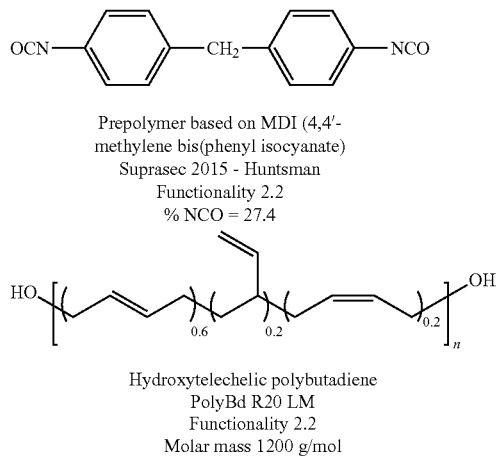

Prepolymer based on MDI (4,4'-methylene bis(phenyl isocyanate)
Suprasec 2015 - Huntsman
Functionality 2.2
% NCO = 27.4

Hydroxytelechelic polybutadiene
PolyBd R20 LM
Functionality 2.2
Molar mass 1200 g/mol The PUs for compositions I4, I5 and I6 according to the invention were obtained with the same second precursor PolyBd R20 LM but with the other first precursors IPDI, HDI and 4,4'-MDI having the formulae illustrated in FIG. 4.

For the second embodiment of the invention illustrated in FIGS. 11 to 20, the NIPUs were obtained in situ with the following first and second precursors for compositions I7, I8, I9, and I10 according to the invention:

1,3-cyclohexanebis(methylamine) (cf. cyclohexamine in the tables below or abbreviated as CHMA), and cyclocarbonate-terminated polybutadiene (abbreviated as PolyBd-CC).

The NIPUs for compositions I11, I12 and I13 were obtained with the same second precursor but with the other first precursors xylylenediamine, EDEA and TAEA having the formulae illustrated in FIG. 12.

As regards the process used for obtaining all of the compositions I1 to I13 according to the invention, the experimental protocol below was followed.

The mixtures of polyisoprene/polymer bearing urethane groups (PU or NIPU) were prepared using a Haake internal mixer for the thermomechanical blending step, and then a Polymix open roll mill for the incorporation of the crosslinking system into the mixture obtained.

The elastomer was introduced first into the internal mixer to enable it to plasticize and to facilitate the incorporation of the other ingredients. The nominal temperature was then 55° C. and the rotor speed was 45 rpm. After blending for 1.5 minutes, the activator complex consisting of stearic acid and ZnO (Silox 3C), the oil (Plaxolene 50) and the N330 carbon black were added. One minute later, the first and second precursors were introduced into the internal mixer. Since these two precursors are liquid, the mechanical blending torque fell considerably on incorporating them, and it was necessary to await the formation of the PU or the NIPU in order for this mechanical torque to increase again. The material was then heated by increasing the speed of the rotors present in the Haake mixer, and the mixture was then recovered when it reached 150° C.

The crosslinking system was then added to the Polymix open mill, the temperature of the rollers having been set at 40° C. Vulcanization of the crosslinkable compositions obtained was then performed by compression-molding under a hydraulic press at 150° C.

For the measurement of the static properties of the compositions including the secant modules M100, M300 and M400, the tensile strength R/r (successively presented from left to right for each material in the attached graphs) and the Shore A hardness, uniaxial tensile tests were performed according to the standard ISO 37: at 23° C. on an Instron 5565 dynamometer with a 10 kN force cell and with a throughput speed of 500 mm/minute. The dumbbell test specimens used were of H2 type (working length=25 mm, width=4 mm, thickness=2 mm).

For the measurement of the dynamic properties of the compositions and notably of said ratio $G'$ 0.5%/$G'$ 20% representative of the Payne effect of the various rubber mixtures and compositions, the process was performed at various temperatures (−30, 0, 25, 65 and 100° C.) on a Metravib DMA+1000 machine. To do this, use was made of ½ QC double shear test specimens, which were subjected to a shear strain ranging from 0.02% to 50% at a frequency of 5 Hz. Preliminary mechanical conditioning (0±4 mm, 50 mm/min, 8 cycles) was performed. The standard ISO4664 of 2005 (confirmed in 2011) was followed for the measurements of these storage moduli $G'$.

First Embodiment of the Invention (PU)

TABLE 1

| Non-reinforced control rubber mixture | | | | |
|---|---|---|---|---|
| Compound | Parts | Density (g/mL) | Volume (mL) | Mass (g) |
| IR Nipol 2200 | 100.00 | 0.92 | 108.70 | 228.48 |
| ZnO 2(silox 3C) 141000 | 5.00 | 5.6 | 0.89 | 11.42 |
| Stearic acid 141500 | 1.00 | 0.85 | 1.18 | 2.28 |
| Plaxolene 50 oil | 3.00 | 0.9 | 3.33 | 6.85 |
| Acc CBS 80% 140130 | 1.40 | 1.22 | 1.15 | 3.20 |
| Rhenogran CLD/80 143910 | 0.6 | 1.199 | 0.50 | 1.37 |
| Sulfur M300 | 1.4 | 2.07 | 0.68 | 3.20 |
| Total | 112.40 | 0.97 | 116.42 | 256.81 |

TABLE 2

| Mixture of the prior art reinforced with 40 phr of carbon black | | | | |
|---|---|---|---|---|
| Compound | Parts | Density (g/mL) | Volume (mL) | Mass (g) |
| IR Nipol 2200 | 100.00 | 0.92 | 108.70 | 192.20 |
| ZnO 2(silox 3C) 141000 | 5.00 | 5.6 | 0.89 | 9.61 |
| Stearic acid 141500 | 1.00 | 0.85 | 1.18 | 1.92 |
| N330 155004 | 40 | 1.82 | 21.98 | 76.88 |
| Plaxolene 50 oil | 3.00 | 0.90 | 3.33 | 5.77 |
| Acc CBS 80% 140130 | 1.4 | 1.22 | 1.15 | 2.69 |
| Rhenogran CLD/80 143910 | 0.60 | 1.20 | 0.50 | 1.15 |
| Sulfur M300 | 1.4 | 2.07 | 0.68 | 2.69 |
| Total | 152.40 | 1.10 | 138.40 | 292.91 |

TABLE 3

Mixture of the prior art with 20 phr of carbon black

| Compound | Parts | Density (g/mL) | Volume (mL) | Mass (g) |
|---|---|---|---|---|
| IR Nipol 2200 | 100.00 | 0.92 | 108.70 | 208.77 |
| ZnO 2(silox 3C) 141000 | 5.00 | 5.6 | 0.89 | 10.44 |
| Stearic acid 141500 | 1.00 | 0.85 | 1.18 | 2.09 |
| N330 155004 | 20 | 1.82 | 10.99 | 41.75 |
| Plaxolene 50 oil | 3.00 | 0.90 | 3.33 | 6.26 |
| Acc CBS 80% 140130 | 1.4 | 1.22 | 1.15 | 2.92 |
| Rhenogran CLD/80 143910 | 0.60 | 1.20 | 0.50 | 1.25 |
| Sulfur M300 | 1.4 | 2.07 | 0.68 | 2.92 |
| Total | 132.40 | 1.04 | 127.41 | 276.41 |

TABLE 4

Rubber mixture not in accordance with the invention (non-reinforced, with 40 phr of a PU derived from PolyBd R20 LM and Suprasec 2015, without chain extender):

| Compound | Parts | Masse volumique (g/mL) | Volume (mL) | Mass (g) |
|---|---|---|---|---|
| IR Nipol 2200 | 100.00 | 0.92 | 108.70 | 165.66 |
| ZnO 2(silox 3C) 141000 | 5.00 | 5.6 | 0.89 | 8.28 |
| Stearic acid 141500 | 1.00 | 0.85 | 1.18 | 1.66 |
| N330 155004 | 0 | 1.82 | 0.00 | 0.00 |
| PolyBd R20 LM | 31.22 | 0.90 | 34.69 | 51.72 |
| MDI Suprasec 2015 | 8.78 | 1.23 | 7.14 | 14.54 |
| CHDM | 0.00 | 1.04 | 0.00 | 0.00 |
| Plaxolene 50 oil | 3.00 | 0.9 | 3.33 | 4.97 |
| Acc CBS 80% 140130 | 2.80 | 1.22 | 2.30 | 4.64 |
| Rhenogran CLD/80 143910 | 1.2 | 1.199 | 1.00 | 1.99 |
| Sulfur M300 | 2.8 | 2.07 | 1.35 | 4.64 |
| Total | 155.80 | 0.97 | 160.57 | 258.09 |

TABLE 5

Rubber composition not in accordance with the invention (with 20 phr of carbon black and 20 phr of PU derived from PolyBd R20 LM and Suprasec 2015, without chain extender):

| Compound | Parts | Density (g/mL) | Volume (mL) | Mass (g) |
|---|---|---|---|---|
| IR Nipol 2200 | 100.00 | 0.92 | 108.70 | 177.67 |
| ZnO 2(silox 3C) 141000 | 5.00 | 5.6 | 0.89 | 8.88 |
| Stearic acid 141500 | 1.00 | 0.85 | 1.18 | 1.78 |
| N330 155004 | 20 | 1.82 | 10.99 | 35.53 |
| PolyBd R20 LM | 15.61 | 0.90 | 17.34 | 27.73 |
| MDI Suprasec 2015 | 4.39 | 1.23 | 3.57 | 7.80 |
| CHDM | 0.00 | 1.04 | 0.00 | 0.00 |
| Plaxolene 50 oil | 3.00 | 0.9 | 3.33 | 5.33 |
| Acc CBS 80% 140130 | 2.24 | 1.22 | 1.84 | 3.98 |
| Rhenogran CLD/80 143910 | 0.96 | 1.199 | 0.80 | 1.71 |
| Sulfur M300 | 2.24 | 2.07 | 1.08 | 3.98 |
| Total | 154.44 | 1.03 | 149.72 | 274.39 |

TABLE 6

Rubber composition I2 according to the invention (with 20 phr of carbon black and 20 phr of PU derived from PolyBd R20 LM and Suprasec 2015, with CHDM chain extender):

| Compound | Parts | Density (g/mL) | Volume (mL) | Mass (g) |
|---|---|---|---|---|
| IR Nipol 2200 | 100.00 | 0.92 | 108.70 | 178.99 |
| ZnO 2(silox 3C) 141000 | 5.00 | 5.6 | 0.89 | 8.95 |
| Stearic acid 141500 | 1.00 | 0.85 | 1.18 | 1.79 |
| N330 155004 | 20 | 1.82 | 10.99 | 35.80 |
| PolyBd R20 LM | 10.93 | 0.90 | 12.14 | 19.56 |
| MDI Suprasec 2015 | 7.15 | 1.23 | 5.82 | 12.80 |
| CHDM | 1.92 | 1.04 | 1.85 | 3.43 |
| Plaxolene 50 oil | 3.00 | 0.9 | 3.33 | 5.37 |
| Acc CBS 80% 140130 | 2.24 | 1.22 | 1.84 | 4.01 |
| Rhenogran CLD/80 143910 | 0.96 | 1.199 | 0.80 | 1.72 |
| Sulfur M300 | 2.24 | 2.07 | 1.08 | 4.01 |
| Total | 154.44 | 1.04 | 148.61 | 276.44 |

TABLE 7

Rubber composition I6 according to the invention (with 20 phr of carbon black and 20 phr of PU derived from PolyBd R20 LM and 4,4'-MDI, with CHDM chain extender):

| Compound | Parts | Density (g/mL) | Volume (mL) | Mass (g) |
|---|---|---|---|---|
| IR Nipol 2200 | 100.00 | 0.92 | 108.70 | 178.51 |
| ZnO 2(silox 3C) 141000 | 5.00 | 5.6 | 0.89 | 8.93 |
| Stearic acid 141500 | 1.00 | 0.85 | 1.18 | 1.79 |
| N330 155004 | 20 | 1.82 | 10.99 | 35.70 |
| PolyBd R20 LM | 11.39 | 0.90 | 12.65 | 20.33 |
| MDI Aldrich | 6.42 | 1.18 | 5.44 | 11.45 |
| CHDM | 2.19 | 1.04 | 2.11 | 3.92 |
| Plaxolene 50 oil | 3.00 | 0.9 | 3.33 | 5.36 |
| Acc CBS 80% 140130 | 2.24 | 1.22 | 1.84 | 4.00 |
| Rhenogran CLD/80 143910 | 0.96 | 1.199 | 0.80 | 1.71 |
| Sulfur M300 | 2.24 | 2.07 | 1.08 | 4.00 |
| Total | 154.44 | 1.04 | 149.01 | 275.70 |

TABLE 8

Rubber composition I4 according to the invention (with 20 phr of carbon black and 20 phr of PU derived from PolyBd R20 LM and IPDI, with CHDM chain extender):

| Compound | Parts | Density (g/mL) | Volume (mL) | Mass (g) |
|---|---|---|---|---|
| IR Nipol 2200 | 100.00 | 0.92 | 108.70 | 177.73 |
| ZnO 2(silox 3C) 141000 | 5.00 | 5.6 | 0.89 | 8.89 |
| Stearic acid 141500 | 1.00 | 0.85 | 1.18 | 1.78 |
| N330 155004 | 20 | 1.82 | 10.99 | 35.55 |
| PolyBd R20 LM | 11.63 | 0.90 | 12.92 | 20.67 |
| IPDI | 6.01 | 1.06 | 5.67 | 10.68 |
| CHDM | 2.36 | 1.04 | 2.27 | 4.20 |
| Plaxolene 50 oil | 3.00 | 0.9 | 3.33 | 5.33 |
| Acc CBS 80% 140130 | 2.24 | 1.22 | 1.84 | 3.98 |
| Rhenogran CLD/80 143910 | 0.96 | 1.199 | 0.80 | 1.71 |
| Sulfur M300 | 2.24 | 2.07 | 1.08 | 3.98 |
| Total | 154.44 | 1.03 | 149.67 | 274.48 |

TABLE 9

Rubber composition I5 according to the invention (with 20 phr of carbon black and 20 phr of PU derived from PolyBd R20 LM and HDI, with CHDM chain extender):

| Compound | Parts | Density (g/mL) | Volume (mL) | Mass (g) |
|---|---|---|---|---|
| IR Nipol 2200 | 100.00 | 0.92 | 108.70 | 177.56 |
| ZnO 2(silox 3C) 141000 | 5.00 | 5.6 | 0.89 | 8.88 |
| Stearic acid 141500 | 1.00 | 0.85 | 1.18 | 1.78 |
| N330 155004 | 20 | 1.82 | 10.99 | 35.51 |
| PolyBd R20 LM | 12.13 | 0.90 | 13.48 | 21.54 |
| HDI | 5.10 | 1.05 | 4.86 | 9.06 |
| CHDM | 2.77 | 1.04 | 2.66 | 4.92 |
| Plaxolene 50 oil | 3.00 | 0.9 | 3.33 | 5.33 |
| Acc CBS 80% 140130 | 2.24 | 1.22 | 1.84 | 3.98 |
| Rhenogran CLD/80 143910 | 0.96 | 1.199 | 0.80 | 1.70 |
| Sulfur M300 | 2.24 | 2.07 | 1.08 | 3.98 |
| Total | 154.44 | 1.03 | 149.80 | 274.23 |

TABLE 10

Rubber composition I3 according to the invention (with 20 phr of carbon black and 20 phr of PU derived from PolyBd R20 LM and Suprasec 2015, with isosorbide chain extender):

| Compound | Parts | Density (g/mL) | Volume (mL) | Mass (g) |
|---|---|---|---|---|
| IR Nipol 2200 | 100.00 | 0.92 | 108.70 | 179.44 |
| ZnO 2(silox 3C) 141000 | 5.00 | 5.6 | 0.89 | 8.97 |
| Stearic acid 141500 | 1.00 | 0.85 | 1.18 | 1.79 |
| N330 155004 | 20 | 1.82 | 10.99 | 35.89 |
| PolyBd R20 LM | 10.93 | 0.90 | 12.14 | 19.61 |
| MDI Suprasec 2015 | 7.14 | 1.23 | 5.80 | 12.80 |
| Isosorbide | 1.94 | 1.30 | 1.49 | 3.47 |
| Plaxolene 50 oil | 3.00 | 0.9 | 3.33 | 5.38 |
| Acc CBS 80% 140130 | 2.24 | 1.22 | 1.84 | 4.02 |
| Rhenogran CLD/80 143910 | 0.96 | 1.199 | 0.80 | 1.72 |
| Sulfur M300 | 2.24 | 2.07 | 1.08 | 4.02 |
| Total | 154.44 | 1.04 | 148.24 | 277.13 |

TABLE 11

Rubber composition I1 according to the invention (with 20 phr of carbon black and 20 phr of PU derived from PolyBd R20 LM and Suprasec 2015, with glycerol chain extender):

| Compound | Parts | Density (g/mL) | Volume (mL) | Mass (g) |
|---|---|---|---|---|
| IR Nipol 2200 | 100.00 | 0.92 | 108.70 | 179.36 |
| ZnO 2(silox 3C) 141000 | 5.00 | 5.6 | 0.89 | 8.97 |
| Stearic acid 141500 | 1.00 | 0.85 | 1.18 | 1.79 |
| N330 155004 | 20 | 1.82 | 10.99 | 35.87 |
| PolyBd R20 LM | 10.93 | 0.90 | 12.14 | 19.60 |
| MDI Suprasec 2015 | 8.07 | 1.23 | 6.56 | 14.48 |
| Glycerol | 1.00 | 1.26 | 0.79 | 1.79 |
| Plaxolene 50 oil | 3.00 | 0.9 | 3.33 | 5.38 |
| Acc CBS 80% 140130 | 2.24 | 1.22 | 1.84 | 4.02 |
| Rhenogran CLD/80 143910 | 0.96 | 1.199 | 0.80 | 1.72 |
| Sulfur M300 | 2.24 | 2.07 | 1.08 | 4.02 |
| Total | 154.44 | 1.04 | 148.30 | 277.00 |

As may be seen in FIG. 1, the non-reinforced mixture with 40 phr of PU synthesized in situ has improved moduli in comparison with the non-reinforced PU-free mixture, without, however, reaching the modulus level of the mixture with 40 phr of carbon black. The Payne effect of this non-reinforced mixture with 40 phr of PU is, however, very much reduced compared with that of the mixture with 40 phr of carbon black instead of PU. The composition not in accordance with the invention with a "mixed reinforcement" of carbon black+PU synthesized in situ without RS makes it possible to obtain better static properties while at the same time having a Payne effect equivalent to that of the non-reinforced mixture with 40 phr of PU (cf. ratio G' 0.5%/G' 20% of 1.05, very much less than that equal to 1.94 for the mixture with 40 phr of carbon black).

As may be seen in FIG. 2, the addition of a chain extender makes it possible to further improve the static properties via the formation of rigid segments (RS) within the PU synthesized in situ, by notably increasing the moduli and the hardness of the compositions. With an RS mass content of 30%, composition I1 shows that the same level of hardness is achieved as for the reference mixture (loaded with 40 phr of carbon black), with in addition a Payne effect that is greatly reduced relative to this reference mixture (cf. ratio G' 0.5%/G' 20% of 1.08).

As may be seen in FIG. 3, the choice of the structure of the chain extender chosen, and thus of the nature of the rigid segments obtained in the elastomer matrix, makes it possible to modify the mechanical properties of compositions I1, I2 and I3, for the same polyisocyanate (Suprasec 2015) and the same RS content of 30%, while at the same time having hardnesses close or equivalent to that of said reference mixture and also low Payne effects (cf. the ratios G' 0.5%/G' 20% at 100° C. which are always less than 1.12, or even less than or equal to 1.10).

As may be seen in FIG. 4, the choice of the structure of the polyisocyanate (for the same CHDM chain extender) also makes it possible to modify the mechanical properties of compositions I2, I4, I5 and I6. The Payne effect at 100° C. remains low for I2, I4, I5 and I6 (cf. ratio G' 0.5%/G' 20% less than or equal to 1.12) and very much less than that of said reference mixture.

As may be seen in FIG. 5 which shows the dynamic properties of compositions I1 to I6 measured at various temperatures (at −30° C., 0° C., 25° C., 65° C. and 100° C.), the Payne effect is considerably reduced for these compositions I1 to I6 in comparison with said reference mixture.

In conclusion, the abovementioned results demonstrate that the dynamic properties of the compositions according to this first embodiment of the invention are markedly improved relative to the prior art represented by said reference mixture (with 40 phr of carbon black and without PU), which advantageously makes it possible to use these compositions in dynamic applications and over a wide temperature range extending from −30° C. to 100° C.

FIGS. 6 to 10 show that the PUs thus obtained in situ are very finely dispersed relatively homogeneously in the polyisoprene in the form of nodules with a larger number-average transverse dimension of between 50 nm and 2 µm, or even between 100 nm and 1 µm. This dispersion contributes toward obtaining the abovementioned mechanical properties of the compositions of the invention, notably including their minimized Payne effect.

In summary, chemical reinforcement of the elastomer matrix with PU networks thus entangled makes it possible to maintain the mechanical properties (moduli and hardness) of compositions I1 to I6 relative to said reference mixture, and while minimizing the nonlinearity (dynamic stiffness) relative to said reference mixture.

The influence of the functionality and of the ethylenic unsaturations of the second precursor on the mechanical properties obtained for the compositions was moreover studied, using the same given masterbatch, the formulation of which is that of the non-reinforced control rubber mixture detailed in table 1 above, by preparing:

A control rubber mixture of the prior art reinforced with 40 phr of N330 carbon black added to the masterbatch;

A composition I1' according to the invention with, in addition to the masterbatch, 20 phr of N330 carbon black and 20 phr of a PU derived from the first MDI precursor "Suprasec 2015", a hydroxytelechelic polybutadiene known as "PolyBd-OH R45 HTLO" as second precursor (Mn=2800 g/mol, functionality=2.5) and the abovementioned CHDM as chain extender;

A rubber mixture No. 1 not in accordance with the invention, with, in addition to the masterbatch, 20 phr of N330 carbon black and 20 phr of a PU derived from the first MDI precursor "Suprasec 2015", CHDM as chain extender and hydroxytelechelic polybutadiene "Krasol LBH 2000" (of Mn=2100 g/mol and a functionality equal to 1.9) as second precursor; and A rubber mixture No. 2 not in accordance with the invention, with, in addition to the masterbatch, 20 phr of N330 carbon black and 20 phr of a PU derived from the first MDI precursor "Suprasec 2015", CHDM as chain extender and hydrogenated hydroxytelechelic polybutadiene "Krasol HLBH-P 2000" (of Mn=2100 g/mol and a functionality equal to 1.9) as second precursor.

Composition I1' and the three abovementioned mixtures were prepared as indicated above with 1.6 equivalents of vulcanization agents as crosslinking system (see table 1) and with a PU comprising 30% of rigid segments RS, as explained above for compositions I1 to I6. Table 12 below summarizes the formulations used starting with the masterbatch for I1' and the mixtures No. 1 and No. 2.

TABLE 12

Composition I1' according to the invention and mixtures No. 1 and 2 (with 20 phr of carbon black and 20 phr of PU derived from Suprasec 2015 and various polybutadienes-OH, with CHDM chain extender):

| Compounds | Composition I1' | Mixture 1 | Mixture 2 |
|---|---|---|---|
| Masterbatch | 134.44 | 134.44 | 134.44 |
| PolyBd R45 HTLO | 12.31 | — | — |
| Krasol LBH 2000 | — | 12.29 | — |
| Krasol HLBH-P 2000 | — | — | 12.29 |
| MDI Suprasec 2015 | 5.78 | 5.80 | 5.80 |
| CHDM | 1.91 | 1.91 | 1.91 |

As may be seen in FIG. 2a, the second precursor Krasol LBH 2000 gives the mixture No. 1 tensile moduli that are markedly lower than those of composition I1', the second polyol precursor of which (just like the first precursor) has a functionality of greater than 2, whereas the molecular mass Mn of Krasol LBH 2000 is less than that of PolyBd R45 HTLO. Despite having shorter flexible segments, poorer mechanical properties were in fact obtained for this mixture No. 1 in which the PU formed is linear, which demonstrates the positive effect of the functionality of 2.5 of the second polyol precursor which makes it possible, via the double bonds thereof, to chemically co-crosslink the PU formed with the elastomer matrix of composition I1', giving this PU a three-dimensional structure which better reinforces the composition.

It is also seen in FIG. 2a that the second hydrogenated precursor Krasol HLBH-P 2000, free of double bonds, gives the mixture No. 2 mechanical properties that are even poorer than those of the mixture No. 1. Specifically, the absence of double bonds in this second precursor counters the co-vulcanization of the PU with the polyisoprene (the PU formed in the mixture No. 2 also being linear) and thus does not generate any covalent bonds between the PU and the elastomer matrix of the mixture, which leads to poorer reinforcement thereof.

The Payne effect obtained for the mixture of the prior art with 40 phr of N330 was measured at 100° C. as indicated above, for the mixtures No. 1 and No. 2 and for composition I1' (see table 13 below).

TABLE 13

| | Control mixture | Composition I1' | Mixture 1 | Mixture 2 |
|---|---|---|---|---|
| G' 0.5% (kPa) | 1928 | 850 | 894 | 786 |
| G' 0.5%/G' 20% | 1.81 | 1.07 | 1.25 | 1.20 |

As may be seen in table 13, the Payne effect is higher with mixtures No. 1 and No. 2 each incorporating a linear PU. It is in fact easier to break, during a dynamic stress, the low-energy bonds between the chains of the linear PU of mixtures No. 1 and No. 2 than to break the three-dimensional network of the co-crosslinked PU of composition I1'.

The intrinsic properties of the second precursor (notably its functionality and its double bonds) are thus determining factors for the production of the targeted mechanical properties of the composition.

Second Embodiment of the Invention (NIPU)

TABLE 14

Rubber composition I7 according to the invention (with 20 phr of carbon black and 20 phr of NIPU derived from PolyBd-CC and 1,3-cyclohexanebis(methylamine), with cyclohexane bis CC extender):

| Compound | Parts | Density (g/mL) | Volume (mL) | Mass (g) |
|---|---|---|---|---|
| IR Nipol 2200 | 100.00 | 0.92 | 108.70 | 177.08 |
| ZnO 2(silox 3C) 141000 | 5.00 | 5.6 | 0.89 | 8.85 |
| Stearic acid 141500 | 1.00 | 0.85 | 1.18 | 1.77 |
| N330 155004 | 20 | 1.82 | 10.99 | 35.42 |
| PolyBd-CC | 10.87 | 0.90 | 12.08 | 19.25 |
| Cyclohexamine | 3.45 | 0.945 | 3.65 | 6.11 |
| Cyclohexane bis CC | 5.68 | 1.00 | 5.68 | 10.06 |
| Plaxolene 50 oil | 3.00 | 0.9 | 3.33 | 5.31 |
| Acc CBS 80% 140130 | 2.24 | 1.22 | 1.84 | 3.97 |
| Rhenogran CLD/80 143910 | 0.96 | 1.199 | 0.80 | 1.70 |
| Sulfur M300 | 2.24 | 2.07 | 1.08 | 3.97 |
| Total | 154.44 | 1.03 | 150.21 | 273.48 |

TABLE 15

Rubber composition I8 according to the invention (with 20 phr of carbon black and 20 phr of NIPU derived from PolyBd-CC and 1,3-cyclohexanebis(methylamine), with resorcinol bis CC extender):

| Compound | Parts | Density (g/mL) | Volume (mL) | Mass (g) |
|---|---|---|---|---|
| IR Nipol 2200 | 100.00 | 0.92 | 108.70 | 177.07 |
| ZnO 2(silox 3C) 141000 | 5.00 | 5.6 | 0.89 | 8.85 |
| Stearic acid 141500 | 1.00 | 0.85 | 1.18 | 1.77 |
| N330 155004 | 20 | 1.82 | 10.99 | 35.41 |
| PolyBd-CC | 10.87 | 0.90 | 12.08 | 19.25 |
| Cyclohexamine | 3.56 | 0.945 | 3.77 | 6.30 |

TABLE 15-continued

Rubber composition I8 according to the invention (with 20 phr of carbon black and 20 phr of NIPU derived from PolyBd-CC and 1,3-cyclohexanebis(methylamine), with resorcinol bis CC extender):

| Compound | Parts | Density (g/mL) | Volume (mL) | Mass (g) |
|---|---|---|---|---|
| Resorcinol bis CC | 5.57 | 1.00 | 5.57 | 9.86 |
| Plaxolene 50 oil | 3.00 | 0.9 | 3.33 | 5.31 |
| Acc CBS 80% 140130 | 2.24 | 1.22 | 1.84 | 3.97 |
| Rhenogran CLD/80 143910 | 0.96 | 1.199 | 0.80 | 1.70 |
| Sulfur M300 | 2.24 | 2.07 | 1.08 | 3.97 |
| Total | 154.44 | 1.03 | 150.22 | 273.47 |

TABLE 16

Rubber composition I9 according to the invention (with 20 phr of carbon black and 20 phr of NIPU derived from PolyBd-CC and 1,3-cyclohexanebis(methylamine), with glycerol tri CC extender):

| Compound | Parts | Density (g/mL) | Volume (mL) | Mass (g) |
|---|---|---|---|---|
| IR Nipol 2200 | 100.00 | 0.92 | 108.70 | 177.07 |
| ZnO 2(silox 3C) 141000 | 5.00 | 5.6 | 0.89 | 8.85 |
| Stearic acid 141500 | 1.00 | 0.85 | 1.18 | 1.77 |
| N330 155004 | 20 | 1.82 | 10.99 | 35.41 |
| PolyBd-CC | 10.87 | 0.90 | 12.08 | 19.25 |
| Cyclohexamine | 3.72 | 0.945 | 3.94 | 6.59 |
| Glycerol tri CC | 5.40 | 1.00 | 5.40 | 9.56 |
| Plaxolene 50 oil | 3.00 | 0.9 | 3.33 | 5.31 |
| Acc CBS 80% 140130 | 2.24 | 1.22 | 1.84 | 3.97 |
| Rhenogran CLD/80 143910 | 0.96 | 1.199 | 0.80 | 1.70 |
| Sulfur M300 | 2.24 | 2.07 | 1.08 | 3.97 |
| Total | 154.43 | 1.03 | 150.22 | 273.45 |

TABLE 17

Rubber composition I10 according to the invention (with 20 phr of carbon black and 20 phr of NIPU derived from PolyBd-CC and 1,3-cyclohexanebis(methylamine), with phloroglucinol tri CC extender):

| Compound | Parts | Density (g/mL) | Volume (mL) | Mass (g) |
|---|---|---|---|---|
| IR Nipol 2200 | 100.00 | 0.92 | 108.70 | 177.08 |
| ZnO 2(silox 3C) 141000 | 5.00 | 5.6 | 0.89 | 8.85 |
| Stearic acid 141500 | 1.00 | 0.85 | 1.18 | 1.77 |
| N330 155004 | 20 | 1.82 | 10.99 | 35.42 |
| PolyBd-CC | 10.87 | 0.90 | 12.08 | 19.25 |
| Cyclohexamine | 3.50 | 0.945 | 3.70 | 6.20 |
| Phloroglucinol tri CC | 5.63 | 1.00 | 5.63 | 9.97 |
| Plaxolene 50 oil | 3.00 | 0.9 | 3.33 | 5.31 |
| Acc CBS 80% 140130 | 2.24 | 1.22 | 1.84 | 3.97 |
| Rhenogran CLD/80 143910 | 0.96 | 1.199 | 0.80 | 1.70 |
| Sulfur M300 | 2.24 | 2.07 | 1.08 | 3.97 |
| Total | 154.44 | 1.03 | 150.22 | 273.48 |

TABLE 18

Rubber composition I11 according to the invention (with 20 phr of carbon black and 20 phr of NIPU derived from PolyBd-CC and xylylenediamine, with phloroglucinol tri CC extender):

| Compound | Parts | Density (g/mL) | Volume (mL) | Mass (g) |
|---|---|---|---|---|
| IR Nipol 2200 | 100.00 | 0.92 | 108.70 | 177.42 |
| ZnO 2(silox 3C) 141000 | 5.00 | 5.6 | 0.89 | 8.87 |
| Stearic acid 141500 | 1.00 | 0.85 | 1.18 | 1.77 |
| N330 155004 | 20 | 1.82 | 10.99 | 35.48 |
| PolyBd-CC | 10.92 | 0.90 | 12.13 | 19.37 |
| Xylylenediamine | 3.39 | 1.032 | 3.28 | 6.01 |
| Phloroglucinol tri CC | 5.70 | 1.00 | 5.70 | 10.11 |
| Plaxolene 50 oil | 3.00 | 0.9 | 3.33 | 5.32 |
| Acc CBS 80% 140130 | 2.24 | 1.22 | 1.84 | 3.97 |
| Rhenogran CLD/80 143910 | 0.96 | 1.199 | 0.80 | 1.70 |
| Sulfur M300 | 2.24 | 2.07 | 1.08 | 3.97 |
| Total | 154.45 | 1.03 | 149.92 | 274.03 |

TABLE 19

Rubber composition I12 according to the invention (with 20 phr of carbon black and 20 phr of NIPU derived from PolyBd-CC and EDEA, with phloroglucinol tri CC extender):

| Compound | Parts | Density (g/mL) | Volume (mL) | Mass (g) |
|---|---|---|---|---|
| IR Nipol 2200 | 100.00 | 0.92 | 108.70 | 177.31 |
| ZnO 2(silox 3C) 141000 | 5.00 | 5.6 | 0.89 | 8.87 |
| Stearic acid 141500 | 1.00 | 0.85 | 1.18 | 1.77 |
| N330 155004 | 20 | 1.82 | 10.99 | 35.46 |
| PolyBd-CC | 10.85 | 0.90 | 12.06 | 19.24 |
| EDEA | 3.59 | 0.998 | 3.60 | 6.37 |
| Phloroglucinol tri CC | 5.56 | 1.00 | 5.56 | 9.86 |
| Plaxolene 50 oil | 3.00 | 0.9 | 3.33 | 5.32 |
| Acc CBS 80% 140130 | 2.24 | 1.22 | 1.84 | 3.97 |
| Rhenogran CLD/80 143910 | 0.96 | 1.199 | 0.80 | 1.70 |
| Sulfur M300 | 2.24 | 2.07 | 1.08 | 3.97 |
| Total | 154.44 | 1.03 | 150.02 | 273.84 |

TABLE 20

Rubber composition I13 according to the invention (with 20 phr of carbon black and 20 phr of NIPU derived from PolyBd-CC and TAEA, with phloroglucinol tri CC extender):

| Compound | Parts | Density (g/mL) | Volume (mL) | Mass (g) |
|---|---|---|---|---|
| IR Nipol 2200 | 100.00 | 0.92 | 108.70 | 177.20 |
| ZnO 2(silox 3C) 141000 | 5.00 | 5.6 | 0.89 | 8.86 |
| Stearic acid 141500 | 1.00 | 0.85 | 1.18 | 1.77 |
| N330 155004 | 20 | 1.82 | 10.99 | 35.44 |
| PolyBd-CC | 11.22 | 0.90 | 12.47 | 19.88 |
| TAEA | 2.55 | 0.977 | 2.61 | 4.52 |
| Phloroglucinol tri CC | 6.23 | 1.00 | 6.23 | 11.04 |
| Plaxolene 50 oil | 3.00 | 0.9 | 3.33 | 5.32 |
| Acc CBS 80% 140130 | 2.24 | 1.22 | 1.84 | 3.97 |
| Rhenogran CLD/80 143910 | 0.96 | 1.199 | 0.80 | 1.70 |
| Sulfur M300 | 2.24 | 2.07 | 1.08 | 3.97 |
| Total | 154.44 | 1.03 | 150.11 | 273.67 |

As may be seen in FIG. 11, the addition of a NIPU synthesized in situ also makes it possible to reinforce the elastomer matrix, as shown notably by the moduli of the IR/NIPU mixtures which are greater than those of the mixture reinforced with only 20 phr of carbon black.

Furthermore, the choice of the structure of the chain extender (with a first polyamine precursor 1,3-cyclohexanebis(methylamine)) makes it possible to modify the mechanical properties of compositions I7 to I10 so as to obtain hardnesses close to that of said reference mixture (with 40 phr of carbon black and without NIPU).

The Payne effect at 100° C. of each of the compositions I7 to I10 is very low (see said ratio of less than or equal to 1.05), irrespective of the chain extender used.

As may be seen in FIG. 12, the choice of the polyamine used (for the same phloroglucinol tri CC chain extender) also has an impact on the mechanical properties of compositions I10 to I13 and makes it possible to give them variable hardnesses (48 to 52 Shore A). In all the cases, the Payne effect at 100° C. is always greatly reduced in comparison with said reference mixture (see said ratio of less than or equal to 1.09, or even 1.06).

As may be seen in FIG. 13 which shows the dynamic properties of compositions I7 to I13 measured at various temperatures (at −30° C., 0° C., 25° C., 65° C. and 100° C.), the Payne effect is considerably reduced for these compositions I7 to I13 in comparison with said reference mixture.

In conclusion, the abovementioned results demonstrate that the dynamic properties of the compositions according to this second embodiment of the invention are markedly improved relative to the prior art represented by said reference mixture (with 40 phr of carbon black and without NIPU), which advantageously makes it possible to use these compositions in dynamic applications and over a wide temperature range extending from −30° C. to 100° C.

FIGS. 14 to 20 show that the NIPUs thus obtained in situ are very finely dispersed relatively homogeneously in the polyisoprene in the form of nodules with a larger number-average transverse dimension of between 50 nm and 2 μm, or even between 100 nm and 1 μm. This dispersion contributes toward obtaining the abovementioned mechanical properties of the compositions of the invention, notably including their minimized Payne effect.

In summary, chemical reinforcement of the elastomer matrix with NIPU networks thus entangled makes it possible to maintain the mechanical properties (moduli and hardness) of compositions I7 to I13 relative to said reference mixture, and while minimizing the nonlinearity (dynamic stiffness) relative to said reference mixture.

The invention claimed is:

1. A rubber composition usable in a mechanical member with a dynamic function selected from the group consisting of antivibration supports and elastic articulations for motorized vehicles or industrial devices, the composition being based on at least one elastomer and comprising:
   a reinforcing filler, and
   a polymer bearing urethane groups dispersed in said at least one elastomer,
      the composition comprising the product of an in situ thermomechanical blending reaction of said at least one elastomer with said reinforcing filler, precursors of said polymer bearing urethane groups and a chain extender,
   in which the composition has a ratio $G'\ 0.5\%/G'\ 20\%$ of storage moduli $G'$ relative to complex shear moduli $G^*$ satisfying at least one of the following conditions (i) to (v), $G'\ 0.5\%$ and $G'\ 20\%$ being measured according to the standard ISO 4664 at respective dynamic strain amplitudes of 0.5% and 20%, on double shear test specimens subjected to shear strains of from 0.02% to 50% at the same frequency of 5 Hz and at the same temperature T:

$$G'0.5\%/G'20\% \leq 1.15 \text{ for } T=100°\text{ C.,} \qquad (i)$$

$$G'0.5\%/G'20\% \leq 1.40 \text{ for } T=65°\text{ C.,} \qquad (ii)$$

$$G'0.5\%/G'20\% \leq 1.50 \text{ for } T=25°\text{ C.,} \qquad (iii)$$

$$G'0.5\%/G'20\% \leq 1.60 \text{ for } T=0°\text{ C.,} \qquad (iv)$$

$$G'0.5\%/G'20\% \leq 2.50 \text{ for } T=-30°\text{ C.,} \qquad (v)$$

and in which said polymer bearing urethane groups is dispersed in said at least elastomer in the form of nodules with a largest number-average transverse dimension of between 1 nm and 5 μm.

2. The rubber composition as claimed in claim 1, in which the composition satisfies at least condition (i), and in which said test specimens are subjected to preliminary mechanical conditioning of 0±4 mm, 50 mm/minute over 8 cycles.

3. The rubber composition as claimed in claim 2, in which the composition satisfies also conditions (ii), (iii), (iv) and (v).

4. The rubber composition as claimed in claim 1, in which the composition comprises (phr: parts by weight per 100 parts of elastomer(s)) from 10 to 40 phr of a carbon black as reinforcing filler and from 10 to 50 phr of said polymer bearing urethane groups.

5. The rubber composition as claimed in claim 4, in which the composition also satisfies the following condition (i-a):

$$G'0.5\%/G'20\% \leq 1.12 \text{ for } T=100°\text{ C.} \qquad (i\text{-}a).$$

6. The rubber composition as claimed in claim 4, in which the composition comprises from 15 to 30 phr of said carbon black and from 15 to 30 phr of said polymer bearing urethane groups.

7. The rubber composition as claimed in claim 1, in which said polymer bearing urethane groups is dispersed in said at least one elastomer in the form of nodules with a largest number-average transverse dimension of between 50 nm and 2 μm.

8. The rubber composition as claimed in claim 1, in which the composition has:
   at least one of the following secant moduli M100, M300 and M400 at 100%, 300% and 400% strain, respectively, measured in uniaxial tension according to the standard ASTM D 412:
   M100≥1.5 MPa,
   M300≥5.5 MPa, and
   M400≥9.5 MPa;
   and/or
   a tensile strength R/r measured in uniaxial tension according to the standard ASTM D 412 of at least 26 MPa.

9. The rubber composition as claimed in claim 1, in which the composition has a Shore A hardness, measured according to the standard ASTM D 2240, of at least 48.

10. The rubber composition as claimed in claim 1, in which said at least one elastomer is a rubber selected from the group consisting of diene and non-diene elastomers, with the exception of silicone rubbers, the composition comprising a crosslinking system which is capable of reacting with said product of said in situ thermomechanical blending reaction to co-crosslink said at least one elastomer with said polymer bearing urethane groups.

11. The rubber composition as claimed in claim 10, in which the crosslinking system is with sulfur.

12. The rubber composition as claimed in claim 10, in which said at least one elastomer is an apolar diene elastomer.

13. The rubber composition as claimed in claim 12, in which said at least one elastomer is selected from the group consisting of natural rubber (NR), polyisoprenes (IR), polybutadienes (BR) and styrene-butadiene copolymers (SBR).

14. The rubber composition as claimed in claim 1, in which said polymer bearing urethane groups is segmented with:
  rigid segments which are present in said polymer in a mass fraction of between 20% and 40%, and which comprise said chain extender and a first said precursor, and with
  flexible segments comprising a second said precursor which is a diene polymer bearing functionalized chain ends,
said polymer bearing urethane groups being co-crosslinked, via double bonds of said second precursor, with said at least one elastomer, forming a three-dimensional network connected via covalent bonds to said at least one elastomer.

15. The rubber composition as claimed in claim 14, in which said rigid segments are present in said polymer in a mass fraction of between 25% and 35%, and wherein in said flexible segments said second precursor is a functionalized polybutadiene.

16. The rubber composition as claimed in claim 14, in which said first precursor and second precursor form two separate reagents for said in situ thermomechanical blending reaction with said at least one elastomer, said reinforcing filler and said chain extender, said precursors not forming a prepolymer of precursors.

17. The rubber composition as claimed in claim 14, in which said chain extender has a molar mass of less than or equal to 700 g/mol.

18. The rubber composition as claimed in claim 14, in which said polymer bearing urethane groups belongs to the family of polyurethanes obtained from an isocyanate compound, excluding polyurethane-ureas.

19. The rubber composition as claimed in claim 18, in which:
  said first precursor is a polyisocyanate with a functionality of greater than 2,
  said second precursor is a diol-functionalized diene polymer with a functionality of greater than 2, and
  said chain extender is a polyol selected from the group consisting of diols and triols which has a molar mass of less than or equal to 300 g/mol.

20. The rubber composition as claimed in claim 19, in which:
  said first precursor is selected from the group consisting of monomers or prepolymers based on 4,4'-methylenebis(phenyl isocyanate), isophorone diisocyanate, hexamethylene diisocyanate and 4,4'-diphenylmethylene diisocyanate,
  said second precursor is a non-hydrogenated hydroxytelechelic polybutadiene with a number-average molecular mass of between 1000 and 3000 g/mol and a functionality of greater than or equal to 2.2, and
  said chain extender is selected from the group consisting of cyclohexanedimethanol, isosorbide and glycerol.

21. The rubber composition as claimed in claim 18, in which:
  said at least one elastomer is an apolar diene elastomer selected from the group consisting of natural rubber (NR), polyisoprenes (IR), polybutadienes (BR) and styrene-butadiene copolymers (SBR),
  said reinforcing filler comprises a carbon black, present in the composition in an amount of between 15 and 30 phr (phr: parts by weight per 100 parts of elastomer(s)),
  said polymer bearing urethane groups is present in the composition in an amount of between 15 and 30 phr, and
  the total amount of said carbon black and of said polymer bearing urethane groups in the composition is between 35 and 55 phr.

22. The rubber composition as claimed in claim 21, in which the composition satisfies the following condition (i-a):

$$G'0.5\%/G'20\% \leq 1.12 \text{ for } T=100° \text{ C}. \tag{i-a}$$

23. The rubber composition as claimed in claim 14, in which said polymer bearing urethane groups belongs to the family of polyhydroxyurethanes obtained without an isocyanate.

24. The rubber composition as claimed in claim 23, in which:
  said first precursor is a polyamine selected from the group consisting of diamines and triamines,
  said second precursor is a diene polymer functionalized with cyclocarbonate chain ends, and
said chain extender is a cyclic carbonate which has a molar mass of less than or equal to 500 g/mol.

25. The rubber composition as claimed in claim 24, in which:
  said first precursor is selected from the group consisting of 1,3-cyclohexanebis(methylamine), xylylenediamine, 2,2'-(ethylenedioxy)bis(ethylamine) and tris(2-aminoethyl)amine,
  said second precursor is a polybutadiene functionalized with two carbonate end rings which are each 5- or 6-membered, and
said chain extender is selected from the group consisting of cyclohexane bis carbonate, resorcinol bis carbonate, glycerol tricarbonate and phloroglucinol tricarbonate.

26. The rubber composition as claimed in claim 23, in which:
  said at least one elastomer is an apolar diene elastomer selected from the group consisting of natural rubber (NR), polyisoprenes (IR), polybutadienes (BR) and styrene-butadiene copolymers (SBR),
  said reinforcing filler comprises a carbon black, present in the composition in an amount of between 15 and 30 phr (phr: parts by weight per 100 parts of elastomer(s)),
  said polymer bearing urethane groups is present in the composition in an amount of between 15 and 30 phr, and
  the total amount of said carbon black and of said polymer bearing urethane groups in the composition is between 35 and 55 phr.

27. The rubber composition as claimed in claim 26, in which the composition satisfies at least one of the following conditions (i-a) to (v-a):

$$G'0.5\%/G'20\% \leq 1.12 \text{ for } T=100° \text{ C.,} \tag{i-a}$$

$$G'0.5\%/G'20\% \leq 1.20 \text{ for } T=65° \text{ C.,} \tag{ii-a}$$

$$G'0.5\%/G'20\% \leq 1.30 \text{ for } T=25° \text{ C.,} \tag{iii-a}$$

$$G'0.5\%/G'20\% \leq 1.40 \text{ for } T=0° \text{ C.,} \tag{iv-a}$$

$$G'0.5\%/G'20\% \leq 1.50 \text{ for } T=-30° \text{ C}. \tag{v-a}$$

28. The rubber composition as claimed in claim 27, in which the composition also satisfies at least one of the following conditions (i-b) to (v-b):

$$G'0.5\%/G'20\% \leq 1.10 \text{ for } T=100° \text{ C.,} \tag{i-b}$$

$$G'0.5\%/G'20\% \leq 1.15 \text{ for } T=65° \text{ C.,} \tag{ii-b}$$

$$G'0.5\%/G'20\% \leq 1.20 \text{ for } T=25° \text{ C.,} \tag{iii-b}$$

$G'0.5\%/G'20\% \leq 1.25$ for $T=0°$ C., (iv-b)

$G'0.5\%/G'20\% \leq 1.40$ for $T=-30°$ C. (v-b).

29. A mechanical member with a dynamic function selected from the group consisting of antivibration supports and elastic articulations for motorized vehicles or industrial devices, said member comprising at least one elastic part which consists of a rubber composition and which is configured to be subjected to dynamic stresses, wherein said composition is as defined in claim 1.

* * * * *